United States Patent
Kim et al.

(10) Patent No.: US 11,731,100 B2
(45) Date of Patent: Aug. 22, 2023

(54) MICROPARTICLE PRODUCING SYSTEM WHICH COMPRISES CARRYING FLUID, AND A CONTROLLING METHOD THEREOF

(71) Applicant: INVENTAGE LAB INC., Gyeonggi-do (KR)

(72) Inventors: Ju Hee Kim, Gyeonggi-do (KR); Donghoon Kim, Gyeonggi-do (KR); Chan Hee Chon, Gyeonggi-do (KR)

(73) Assignee: INVENTAGE LAB INC., Gyeonggi-do (KR)

( * ) Notice: Subject to any disclaimer, the term of this patent is extended or adjusted under 35 U.S.C. 154(b) by 0 days.

(21) Appl. No.: 17/759,237

(22) PCT Filed: Jan. 27, 2021

(86) PCT No.: PCT/KR2021/001075
§ 371 (c)(1),
(2) Date: Jul. 21, 2022

(87) PCT Pub. No.: WO2021/157942
PCT Pub. Date: Aug. 12, 2021

(65) Prior Publication Data
US 2023/0071710 A1    Mar. 9, 2023

(30) Foreign Application Priority Data

Feb. 3, 2020   (KR) .................. 10-2020-0012565

(51) Int. Cl.
*B01J 19/06*   (2006.01)
*B01J 19/00*   (2006.01)
*A61K 9/00*   (2006.01)

(52) U.S. Cl.
CPC ........... *B01J 19/0033* (2013.01); *B01J 19/06* (2013.01); *B01J 2219/00164* (2013.01)

(58) Field of Classification Search
CPC .................. B01J 19/01; B01J 19/0033
See application file for complete search history.

(56) References Cited

U.S. PATENT DOCUMENTS 7,595,195 B2 *  9/2009  Lee ................... B01J 13/02
                                                 436/52
7,943,348 B2 *  5/2011  Cho .................. G01N 35/08
                                                 435/6.12
(Continued)

FOREIGN PATENT DOCUMENTS

| JP | 2005300398 A | * | 10/2005 | |
| WO | 2015/088299 A1 | | 6/2015 | |
| WO | WO-2017014431 A1 | * | 1/2017 | ............. A61L 27/14 |

OTHER PUBLICATIONS

Korean Office Action dated Mar. 8, 2021 for corresponding Korean Application No. 10-2020-0012565 and English translation.
(Continued)

*Primary Examiner* — Atul P. Khare
(74) *Attorney, Agent, or Firm* — Pearne & Gordon LLP

(57) ABSTRACT

A microparticle producing system using microfluidics and a controlling method thereof, and specifically, to a microparticle producing system that may stably transport droplets produced using microfluidics without agglomeration or destruction, compared to the conventional art, and a method of controlling the microparticle producing system to transport the droplets more stably in the microparticle producing system. By the microparticle producing system and the controlling method thereof, which are disclosed herein, droplets produced by the microparticle producing system using microfluidics may be stably transported without agglomeration or destruction, resulting in more effective microparticle production.

7 Claims, 23 Drawing Sheets

(56) References Cited

U.S. PATENT DOCUMENTS

| | | | |
|---|---|---|---|
| 8,096,421 B2* | 1/2012 | Shinoda | B01L 3/502776 209/552 |
| 8,715,591 B2* | 5/2014 | Gaitan | A61K 9/1277 422/502 |
| 10,632,442 B2* | 4/2020 | Kim | B01F 33/30 |
| 11,344,624 B2* | 5/2022 | Kim | A61K 9/5084 |
| 2005/0032240 A1 | 2/2005 | Lee et al. | |
| 2008/0213593 A1 | 9/2008 | Bala Subramaniam et al. | |
| 2011/0129941 A1 | 6/2011 | Kumacheva et al. | |
| 2011/0223314 A1 | 9/2011 | Zhang et al. | |

OTHER PUBLICATIONS

International Search Report for corresponding International Application No. PCT/KR2021/001075 dated May 28, 2021.
Written Opinion for corresponding International Application No. PCT/KR2021/001075 dated May 28, 2021.
Korean Office Action dated Sep. 15, 2021 for corresponding Korean Application No. 10-2020-0012565 and English translation.
Grant of Patent dated Mar. 22, 2022 for corresponding Korean Application No. 10-2020-0012565 and English translation.
English translation of the Korean Written Opinion for corresponding International Application No. PCT/KR2021/001075 dated May 28, 2021.

* cited by examiner

FIG. 4
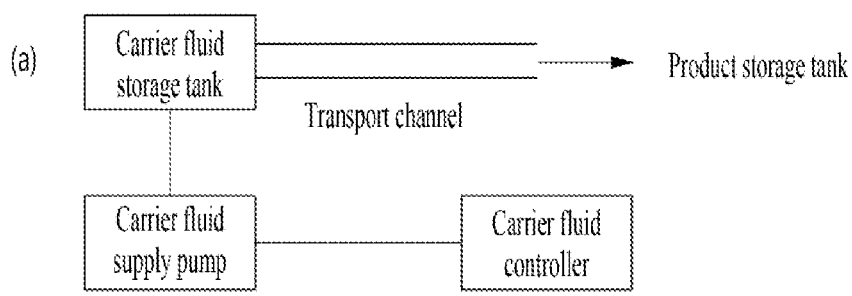
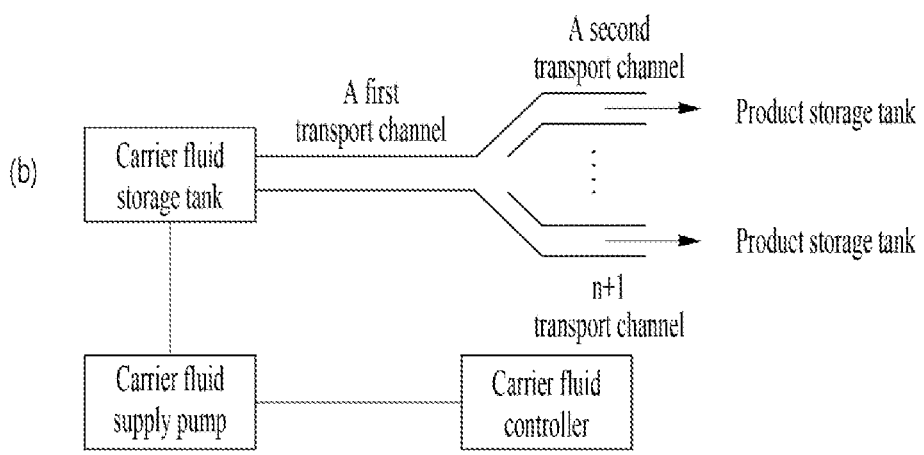

FIG. 14
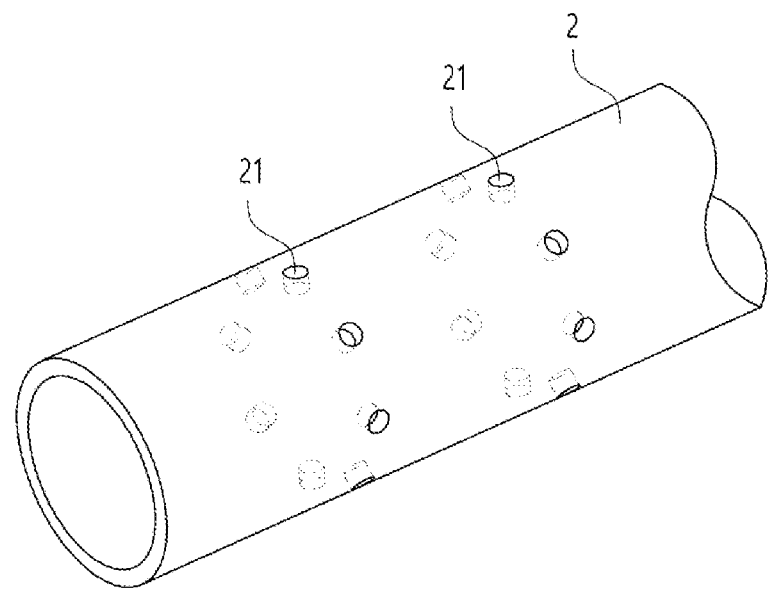
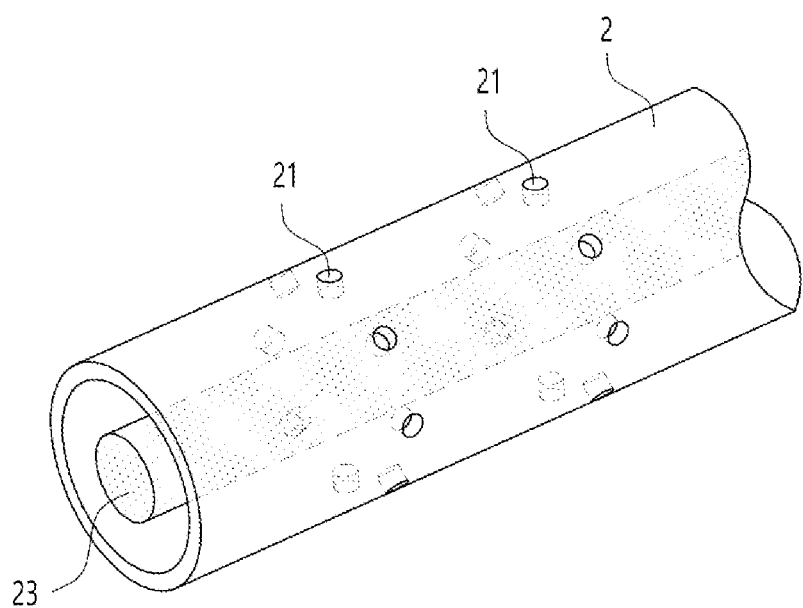

FIG. 15
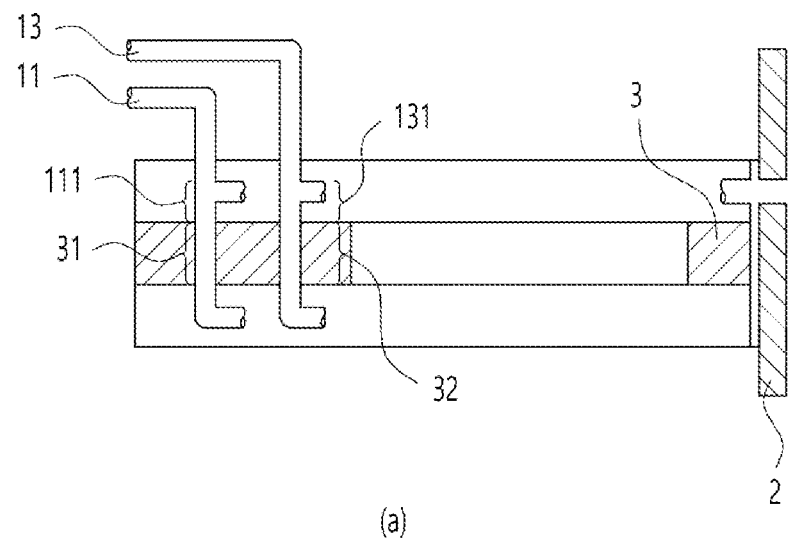
(a)
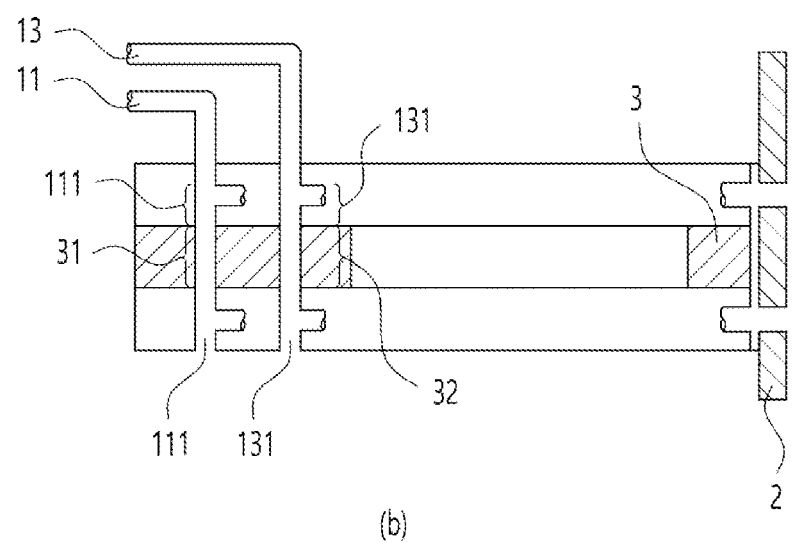
(b)

MICROPARTICLE PRODUCING SYSTEM WHICH COMPRISES CARRYING FLUID, AND A CONTROLLING METHOD THEREOF

CROSS-REFERENCE TO RELATED APPLICATIONS

This application is a national stage entry of International Application No. PCT/KR2021/001075 filed on Jan. 27, 2021, which claims the benefit of priority to Korean Application No. KR10-2020-0012565, filed Feb. 3, 2020, the entire disclosures of which are hereby incorporated herein by reference.

TECHNICAL FIELD

The present invention disclosed herein relates to a microparticle producing system using microfluidics and a method of controlling the same.

BACKGROUND ART

Microparticles formed of a biodegradable polymer can be injected into the human body, and are slowly decomposed at regular intervals in the body, so they are applied in various fields such as sustained-release formulations, filler formulations, etc. However, in order to apply such microparticles formed of a biodegradable polymer in a sustained-release formulation, the surface properties and diameter of the produced microparticles should be uniformly controlled.

As a method of producing such microparticles, a method of producing microparticles using microfluidics has an advantage of controlling the surface properties and diameter with high accuracy compared to other production methods such as a solvent evaporation method and has a disadvantage of difficult mass production because the scale of a production device is very small. To overcome this disadvantage, there have been attempts to construct a mass production system by arranging a number of microfluidic devices in parallel, but this system has difficulty in controlling a production process.

DISCLOSURE

Technical Problem

The present specification is directed to providing a microparticle producing system that allows droplets produced using microfluidics, compared to the conventional art, to be stably transported without agglomeration or destruction.

The present specification is directed to providing a method for controlling the microparticle producing system to transport the droplets more stably in the microparticle producing system.

Technical Solution

To solve the technical problems described above, as one aspect of the present invention provided herein, a method of controlling a microparticle producing system is provided. The method comprises the steps of supplying a carrier fluid to a transport channel; supplying one material comprising at least a first material and a second material to a droplet producing chip to discharge a discharge fluid to the transport channel through an outlet channel, wherein the discharge fluid comprises a material fluid comprising the first material and a droplet comprising the second material, the droplet is produced from the material in the droplet producing chip; and generating a combined fluid by combining the carrier fluid with the discharge fluid, wherein the supplying the carrier fluid to the transport channel is for allowing a flow rate of the combined fluid larger than that of the discharge fluid.

As one aspect of the present invention provided herein, a method of controlling a microparticle producing system is provided. The method comprises the steps of supplying a first carrier fluid to a first transport channel; supplying one material comprising at least a first material and a second material to a first droplet producing chip to discharge a first discharge fluid to a first transport channel through a first outlet channel, wherein the first discharge fluid comprises a first material fluid comprising the first material and a first droplet comprising the second material, the first droplet is produced from the material in the first droplet producing chip; generating a first combined fluid by combining the first carrier fluid with the first discharge fluid; supplying a second carrier fluid to a second transport channel; supplying a material comprising at least the first material and the second material to a second droplet producing chip to discharge a second discharge fluid to a second transport channel through a second outlet channel, the second discharge fluid comprises a second material fluid comprising the first material and a second droplet comprising the second material, the second droplet is produced from the material in the second droplet producing chip; generating a second combined fluid by combining the second carrier fluid with the second discharge fluid; and combining the first combined fluid with the second combined fluid and then transporting the combined fluid to a product storage tank, a carrier fluid controller controls one or more selected from a flow rate and a flow velocity of the first carrier fluid and the second carrier fluid so that the first combined fluid and the second combined fluid maintain a laminar flow when the first combined fluid and the second combined fluid are combined.

As one aspect of the present invention provided herein, a microparticle producing system is provided. The system comprises a first droplet producing chip, wherein the first droplet producing chip comprises an inlet channel, a microchannel, a junction, and a first outlet channel; a transport channel; a carrier fluid source; and a carrier fluid controller; wherein the outlet channel and the transport channel are connected so that a fluid can flow, the carrier fluid source and the transport channel are connected so that a fluid can flow, the carrier fluid controller is connected to transmit a control signal to the carrier fluid source, the transport channel is for transporting a discharge fluid comprising a material and a droplet discharged from the first droplet producing chip to a product storage tank, the carrier fluid source is for achieving a function of the transport channel by receiving the control signal of the carrier fluid controller and supplying a carrier fluid to the transport channel.

As one aspect of the present invention provided herein, a microparticle producing system is provided. The system comprises a first droplet producing chip, wherein the first droplet producing chip comprises an inlet channel, a microchannel, a junction, and a first outlet channel; a second droplet producing chip, wherein the second droplet producing chip comprises an inlet channel, a microchannel, a junction, and a second outlet channel; a first transport channel; a second transport channel; a third transport channel; a carrier fluid source; a carrier fluid controller; and a product storage tank; wherein the first outlet channel and the first transport channel are connected so that a fluid can flow, the second outlet channel and the second transport channel are connected so that a fluid can flow, the carrier fluid source and the first transport channel are connected so that a fluid can flow, the carrier fluid source and the second transport channel are connected so that a fluid can flow, the carrier fluid controller is connected to transmit control signal to the carrier fluid source, the first transport channel and the second transport channel are for transporting a discharge fluid comprising a material and a droplet discharged from the droplet producing chip to the product storage tank, the first transport channel and the second transport channel are connected with the third transport channel at a confluence, the third transport channel is connected with the product storage tank, wherein the first transport channel and the second transport channel are connected with the product storage tank through the confluence and the third transport channel.

Advantageous Effects

By using a microparticle producing system disclosed in the present specification and a controlling method thereof, more effective microparticle production can be performed by stably carrying droplets produced by the microparticle producing system that takes advantage of microfluidics without agglomeration or destruction. The present invention corresponds to an essential technique for constructing a system for mass production of microparticles using microfluidics.

DESCRIPTION OF DRAWINGS

FIG. 4 shows the connection relationship between a carrier fluid storage tank and a transport channel according to Example 1. FIG. 4A shows the connection relationship between a carrier fluid storage tank and one transport channel. FIG. 4B shows that a carrier fluid storage tank and a first transport channel are directly connected and shows a connection relationship when the first transport channel is divided into a second transport channel to a n+1 transport channel.

FIG. 6A shows the connection relationship between a product storage tank and one transport channel. FIG. 6B shows the connection relationship when a second transport channel to a n+1 transport channel is connected with a n+2 transport channel, and the n+2 transport channel is directly connected with the product storage tank.

FIG. 9A is a perspective view in which a plurality of droplet producing chips are arranged at regular intervals. FIG. 9B is a plan view when FIG. 9A is seen in the Y-axis direction.

FIG. 10A shows a transport channel (2) including a discharge fluid inlet port (21). FIG. 10B shows that the transport channel (2) is connected with a plurality of droplet producing chips (1). FIG. 10C shows the positions and flow directions of a carrier fluid, a discharge fluid, and a combined fluid in the transport channel.

FIG. 12A is a perspective view of an annular chip. FIG. 12B is a plan view of the annular chip seen in the Z-axis direction.

FIG. 13A is a diagram showing how a first droplet producing chip, a spacer, and a second droplet producing chip are assembled. FIG. 13B is a cross-sectional view when FIG. 13A is cut along the A-A' direction, showing that the space itself serves as a transport channel. FIG. 13C is a cross-sectional view when FIG. 13A is cut along the A-A' direction, showing that the transport channel passes through an empty space.

FIG. 14 shows a transport channel according to Example 3. FIG. 14A shows a case having no core structure. FIG. 14B shows a case having a core structure.

FIG. 15 shows a case in which a first droplet producing chip and/or a second droplet producing chip include(s) a first material intermediate supply channel (111) and a second material intermediate supply channel (131) according to Example 3.

FIG. 15A shows a case in which a first droplet producing chip has a first material intermediate supply channel (111) and a second material intermediate supply channel (131). FIG. 15B shows a case in which both a first droplet producing chip and a second droplet producing chip have a first material intermediate supply channel (111) and a second material intermediate supply channel (131).

MODES OF THE INVENTION

Microparticle Producing System

As one aspect of the present invention provided herein, a microparticle producing system is provided.

The microparticle producing system, which is one aspect of the present invention provided herein, includes a droplet producing chip, a transport channel, a carrier fluid source, and a carrier fluid controller.

A device for microparticle mass production using microfluidics must have a structure that increases production by connecting numerous devices in parallel. Therefore, it is very important to stably transport an intermediate product of the process of producing microparticles, such as droplets, to the device where the next production process takes place. Moreover, since the droplets have not yet stabilized their structure, there is a problem in that agglomeration or destruction frequently occurs during transport, so there is a high technical demand to solve this problem.

To fulfill such technical demands, the microparticle producing system provided herein has a structure capable of introducing a carrier fluid into the production system. The microparticle producing system provides an improved transport channel compared to the conventional art, and further includes a carrier fluid source and a carrier fluid controller. Specifically, the transport channel has a structure where materials and a carrier fluid distinct from a discharge fluid can be introduced to transport the discharge fluid discharged from a droplet producing chip. Due to such a structure, the carrier fluid may be introduced into the microparticle producing system during the process of transporting droplets to another device (e.g., a product storage tank) after production of the droplets. As the carrier fluid may stably carry the produced droplet to another device without agglomeration or destruction, the production efficiency of the microparticle producing system can increase. In addition, to introduce the carrier fluid into the production system, the microparticle producing system further includes a carrier fluid source and a carrier fluid controller.

Figure 1:
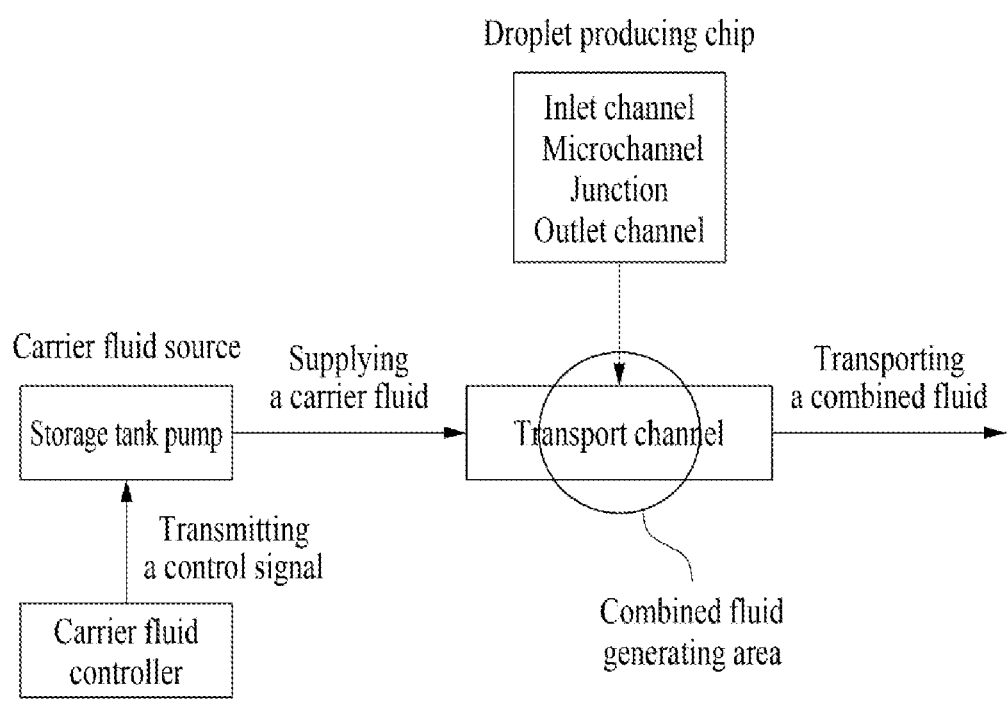
FIG. 1 is a schematic diagram of a microparticle producing system provided herein.
Figure 2:
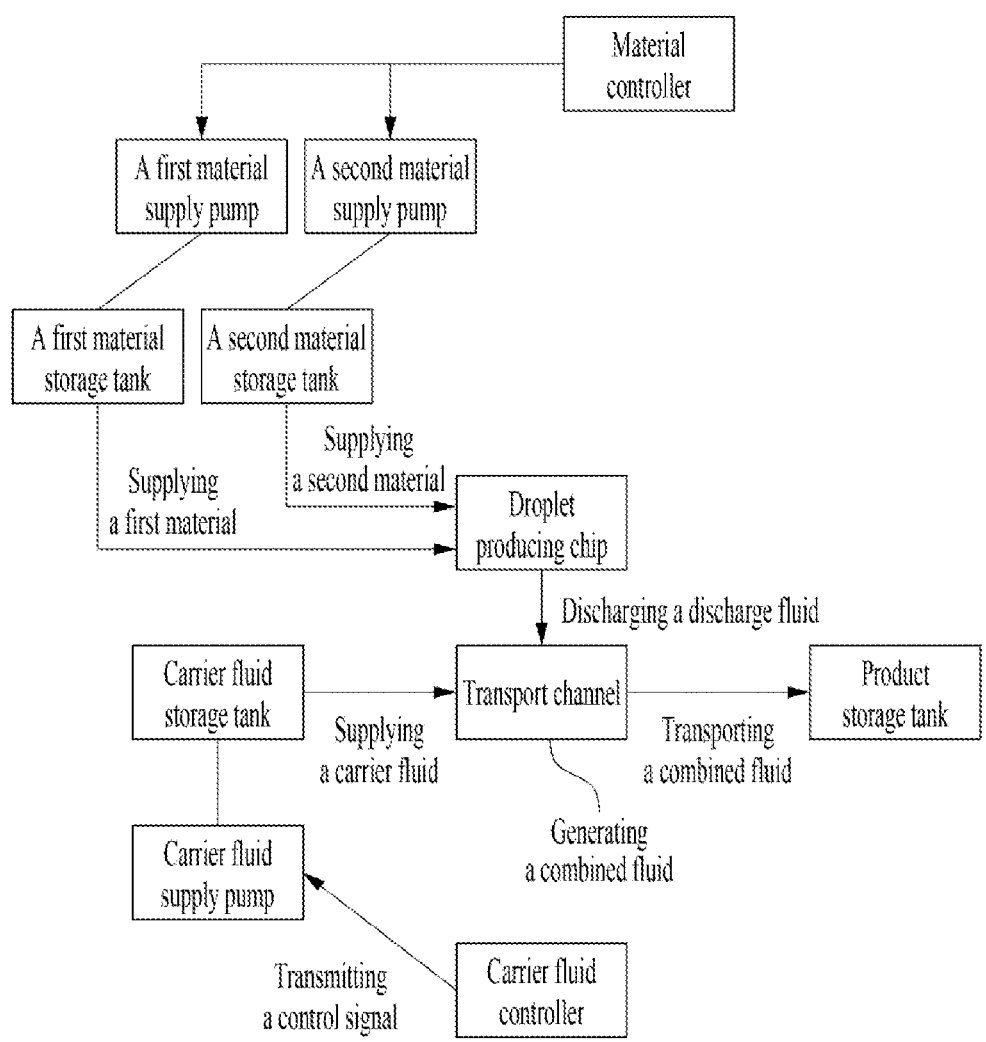
FIG. 2 is a schematic diagram of a microparticle producing system according to Example 1.
Figure 3:
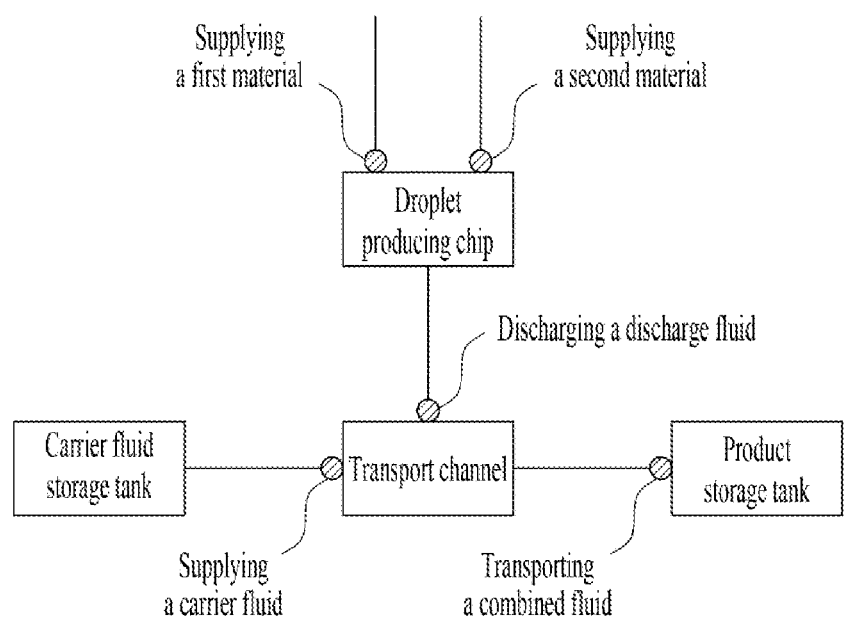
FIG. 3 is a schematic diagram of a microparticle producing system including a plurality of sensors according to Example 1.
Figure 5:
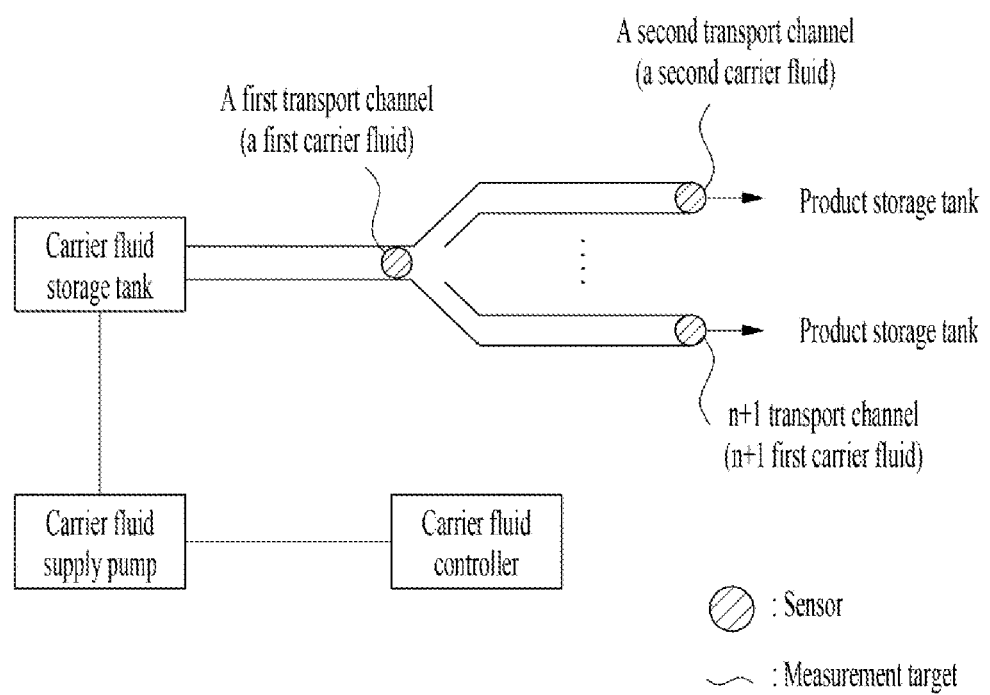
FIG. 5 shows the connection relationship when a sensor is connected to the transport channel in FIG. 4B.

The schematic diagram of the microparticle producing system is shown in FIG. 1.

The droplet producing chip may include an inlet channel, a microchannel, a junction, and an outlet channel. The droplet producing chip may receive a material fluid to produce droplets, and discharge the discharge fluid containing the droplets into a transport channel through an outlet channel, and to perform the above functions, the components may be appropriately connected.

The transport channel is connected with a carrier fluid source to allow a received carrier fluid to flow in the transport channel, and serves to produce and transport a combined fluid by combining the carrier fluid with a discharge fluid discharged from the droplet producing chip at a combined fluid-generating area, and to perform such functions, components may be appropriately connected. The transport channel may include a carrier fluid inlet.

The carrier fluid source may include components for storing the carrier fluid or providing the carrier fluid to the transport channel.

Specifically, the carrier fluid source may include a carrier fluid storage tank and a carrier fluid supply pump, which may be appropriately connected.

The carrier fluid controller may include a memory, a microprocessor, and a control signal transmitter. When the carrier fluid controller provides a carrier fluid to a transport channel from the carrier fluid source, it may control a method of providing a carrier fluid or have function of combining the discharge fluid with the carrier fluid in the transport channel, and include components that can serve the above-described functions, which may be appropriately connected to perform the above-described functions.

Hereinafter, components of the microparticle producing system and their connections will be described in further detail.

Droplet Producing Chip and Peripheral Components

The microparticle producing system provided herein may include one or more droplet producing chips.

The droplet producing chip may be formed in a shape that can be suitably selected by those of ordinary skill in the art. Specifically, the droplet producing chip may be formed in a square, circular, or annular shape, but the present invention is not limited thereto.

The plurality of droplet producing chips included in the microparticle producing system may have the same or similar shape.

The plurality of droplet producing chips included in the microparticle producing system may have different shapes.

The droplet producing chip may include an inlet channel, a microchannel, a junction structure where one or more microchannels meet, and an outlet channel.

The inlet channel is a structure that allows a material introduced into the droplet producing chip to flow through the microchannel.

In one embodiment, the shape and dimension of the inlet channel may be suitably selected by those of ordinary skill in the art so that the droplet producing chip can function appropriately. Specifically, the inlet channel may have a tube shape with a diameter of 0.5 to 1 mm, but the present invention is not limited thereto.

The microchannel is a structure that allows a material supplied through the inlet channel to flow toward the junction structure, and the shape and dimension of the microchannel may be appropriately selected by those of ordinary skill in the art to enable droplet production by applying microfluidics. Specifically, the cross-section of the microchannel may have a trapezoidal, semicircular, square, or another appropriate shape. More specifically, the cross-section of the microchannel has a square shape, and its width may be 30 to 150 micrometers, but the present invention is not limited thereto.

The junction structure may have a structure that allows material fluids supplied through two or more of the microchannels to be combined together to form droplets, and the shape of the junction structure may be appropriately selected by those of ordinary skill in the art to enable droplet production by applying microfluidics. Specifically, the junction structure may be a T or X junction, but the present invention is not limited thereto.

The outlet channel may be a component that allows the droplets produced in the junction structure to be discharged through a sidewall of the droplet producing chip, and specifically, it may have a microchannel shape extended from a junction, but the present invention is not limited thereto.

The droplet producing chip may include a plurality of microchannels, junctions, or outlet channels.

The microparticle producing system may further include a material storage tank, a material supply pump, and a material controller.

The shape, material and configuration of the material storage tank and the material supply pump may be appropriately selected by those of ordinary skill in the art so that the material can be provided to the droplet producing chip through the inlet channel. In addition, the microparticle producing system may include a plurality of material storage tanks and a material supply pump. Specifically, the microparticle producing system may include a first material storage tank which stores a first material and a second material storage tank which stores a second material, but the present invention is not limited thereto.

The material controller may control a method of supplying the materials stored in the material supply pump and the material storage tank through an inlet channel, and may be appropriately selected by those of ordinary skill in the art to perform the above-described function. Specifically, the material controller may include a memory, an arithmetic unit, a control signal transmitter, and a measurement signal receiver, but the present invention is not limited thereto.

Transport Channel and Peripheral Components

The microparticle producing system provided herein includes one or more transport channels.

The transport channel may have a structure where a carrier fluid is introduced and flows, and its shape and dimension may be appropriately selected by those of ordinary skill in the art to transport a fluid or droplets introduced into the carrier fluid to a storage tank.

In one embodiment, all or some of the transport channels may have a closed shape. The cross-section of the transport channel may have any of the shapes that can be selected by those of ordinary skill in the art. For example, the shape may be a rectangular, circular, annular, or oval shape, but the present invention is not limited thereto.

In one embodiment, all or some of the transport channels may have an open shape. The cross-section of the transport channel may have any of the appropriate shapes that can be selected by those of ordinary skill in the art. For example, the transport channel may have a square pillar shape with one open side, but the present invention is not limited thereto.

In one embodiment, the transport channel may include a droplet inlet. The droplet inlet may have any appropriate location and shape that can be selected by those of ordinary skill in the art to allow droplets to be introduced into the transport channel. For example, the droplet inlet may be formed in all or a part of the surface of the transport channel, but the present invention is not limited thereto. In another embodiment, the droplet inlet may have a rectangular, circular, annular, or oval cross-section, but the present invention is not limited thereto.

In one embodiment, all or some of the transport channels may be included in the droplet producing chip. Specifically, some of the transport channels may be included in the form of at least one microchannel in the droplet producing chip.

The transport channel may include a carrier fluid inlet. All appropriate shapes and dimensions of the carrier fluid inlet, which can be selected by those of ordinary skill in the art, may be included in order to supply a carrier fluid to the transport channel.

The microparticle producing system may further include a transport channel outlet, a product storage tank, and a post-processing device.

The transport channel outlet is a structure that allows the fluid flowing in the transport channel to be discharged to the storage tank, and has any shape, material and dimension, which can be appropriately selected by those of ordinary skill in the art. For example, the transport channel may have a tube shape, but the present invention is not limited thereto.

The product storage tank is a structure that stores the fluid discharged from the transport channel and the droplets produced in the droplet producing chip, and has any shape, material, and dimension, which can be appropriately selected by those of ordinary skill in the art. For example, the product storage tank may be a metal cylindrical structure, but the present invention is not limited thereto.

The post-processing device refers to any device for producing microparticles from the droplets produced in the droplet producing chip, and includes all devices for performing a process necessary for producing microparticles from the droplet by those of ordinary skill in the art. For example, the post-processing device may include a stirring device, but the present invention is not limited thereto.

The microparticle producing system may further include an adapter.

The adapter may be a structure in which a droplet producing chip and the transport channel are connected and the transport channel and a product storage tank are connected. For example, the adapter may be formed as a tube connecting an outlet channel of a droplet producing chip with the transport channel, but the present invention is not limited thereto.

Carrier Fluid Source and Peripheral Components

The microparticle producing system provided herein includes a carrier fluid source.

The carrier fluid source may include a device for storing a carrier fluid to supply a carrier fluid to the transport channel and a device for connecting a transport channel and a carrier fluid storage tank so that a fluid can flow, thereby supplying the carrier fluid to the transport channel, and may include all appropriate devices that can be selected by those of ordinary skill in the art to achieve the above-described functions.

In one embodiment, the carrier fluid source may include a carrier fluid storage tank, a carrier fluid supply pump, and a carrier fluid supply channel.

The carrier fluid storage tank is a device for storing the carrier fluid, and has any shape, material, and dimension, which can be appropriately selected by those of ordinary skill in the art.

The carrier fluid supply pump is a device for supplying pressure to the carrier fluid storage tank to make a flow of the carrier fluid, and has any shape, material, and dimension, which can be appropriately selected by those of ordinary skill in the art. For example, the carrier fluid supply pump may be a gas pressure pump, a hydraulic pump, or a syringe pump, but the present invention is not limited thereto.

In one embodiment, the carrier fluid storage tank may be the same as all or a part of a material fluid storage tank included in the microparticle producing system. Further, the carrier fluid storage tank and all or a part of the material fluid storage tank may refer to the same device in the microparticle producing system.

In one embodiment, the carrier fluid supply pump may be the same as all or a part of a material fluid supply pump included in the microparticle producing system. Further, the carrier fluid supply pump and all or a part of the material fluid supply pump may refer to the same device in the microparticle producing system.

In one embodiment, the microparticle producing system may include a plurality of carrier fluid sources. Specifically, the microparticle producing system may include a plurality of carrier fluid storage tanks, carrier fluid supply pumps and/or carrier fluid supply channels.

Carrier Fluid Controller and Peripheral Components

The microparticle producing system provided herein includes a carrier fluid controller.

The carrier fluid controller refers to a device for controlling a carrier fluid supplied to a transport channel. It includes all appropriate devices that can be selected by those of ordinary skill in the art to achieve this function. Specifically, the carrier fluid controller may include a memory, an arithmetic unit, a control signal transmitter, and a measurement signal receiver, but the present invention is not limited thereto.

In one embodiment, the microparticle producing system may include a plurality of carrier fluid controllers.

In one embodiment, in the microparticle producing system, the carrier fluid controller may refer to the same device as a material controller.

The microparticle producing system may further include one or more sensors.

The sensor is a component for measuring the properties of a fluid flowing through the inlet channel, the outlet channel, and the transport channel, and includes all appropriate devices that can be selected by those of ordinary skill in the art to achieve the above-derived function. Specifically, the sensor may be a sensor for measuring one or more of a flow rate, a flow velocity, a temperature, pressure and the presence or absence of turbulence of the fluid flowing through the channels, but the present invention is not limited thereto.

Connections Between Components

Entire Connections

The connections between components of a microparticle producing system provided herein may be schematically shown in FIG. 1.

The connections between components of a microparticle producing system provided herein may include a droplet producing chip, a transport channel, a carrier fluid source, and a carrier fluid controller, and includes organic connections between the components. Specifically, the carrier fluid source and the transport channel are connected with each other so that a fluid can flow, the carrier fluid controller may be connected to transmit a control signal to the carrier fluid source, and the droplet producing chip and the transport channel are connected with each other so that a fluid can flow.

In addition, the carrier fluid source may further include a carrier fluid storage tank and a carrier fluid supply pump, the carrier fluid storage tank and the transport channel may be connected so that a fluid flows, the carrier fluid supply pump may be connected to transmit pressure to the carrier fluid storage tank, and the carrier fluid controller may be connected to transmit a control signal to the carrier fluid supply pump to control the flow of the carrier fluid by controlling the carrier fluid supply pump.

In addition, the microparticle producing system may further include a material controller, a material storage tank, a material supply pump, a product storage tank, and/or a sensor, and includes organic connections between the components. Specifically, to perform a function of supplying a material to the droplet producing chip, the material storage tank and the droplet producing chip are connected to each other so that a fluid can flow, the material supply pump may be connected with the material storage tank to make a flow of the material by supplying pressure to the material fluid storage tank, the material controller may be connected to transmit a control signal to the material supply pump, and the sensor may be connected to transmit a measurement value to the carrier fluid controller and/or the material controller.

Hereinafter, the connections between components will be described in further detail.

Connection Between Carrier Fluid Source and Each Component

A microparticle producing system provided herein includes a carrier fluid source. The carrier fluid source may have an appropriate component to introduce a carrier fluid into the microparticle producing system by supplying the carrier fluid to a transport channel, and includes an organic connection between each component.

In one embodiment, the carrier fluid source may further include a carrier fluid storage tank and a carrier fluid supply pump. The carrier fluid supply pump is connected such that a flow of the carrier fluid stored in the carrier fluid storage tank is made by transmitting pressure to the carrier fluid storage tank.

In one embodiment, the carrier fluid supply pump may be connected to transmit pressure to a plurality of carrier fluid sources.

In one embodiment, the carrier fluid source may be connected to transmit pressure from a plurality of carrier fluid supply pumps.

Connection Between Carrier Fluid Controller and Carrier Fluid Source

The microparticle producing system provided herein includes an organic connection between the carrier fluid controller and the carrier fluid source. Specifically, the carrier fluid controller may be connected to transmit and receive a certain signal to and from the carrier fluid source so that the carrier fluid source can control a process of supplying the carrier fluid to the transport channel.

In one embodiment, the carrier fluid controller may be connected to transmit a control signal to the carrier fluid source.

In one embodiment, the carrier fluid controller may be connected to simultaneously and/or sequentially transmit a control signal to a plurality of carrier fluid sources.

In one embodiment, when the carrier fluid source includes a carrier fluid storage tank and a carrier fluid supply pump, the carrier fluid controller may be connected to transmit a control signal to the carrier fluid supply pump.

Connections Between Components Included in Droplet Producing Chip

The droplet producing chip included in the microparticle producing system provided herein may include one or more of each of an inlet channel, a microchannel, a junction, and an outlet channel inside or outside thereof. The droplet producing chip has a certain connection between the components to perform a function of producing droplets by receiving a material fluid, and discharging them through the outlet channel.

The inlet channel, microchannel, junction and outlet channel of the droplet producing chip may be connected with each other so that a fluid can flow. However, when there are two or more of each of the inlet channel, microchannel, junction and outlet channel, it does not mean that all components are connected so that a fluid can flow and thus specific connections will be described in further detail below.

In one embodiment, the inlet channel and the microchannel are connected with each other so that a fluid can flow. For example, the inlet channel and the microchannel may be connected with each other by an inlet port formed in the droplet producing chip, but the present invention is not limited thereto. In another example, the inlet channel and the microchannel may be connected with each other by an adapter.

In one embodiment, the droplet producing chip may include a first inlet channel through which a first material can flow and a second inlet channel through which a second material can flow, and may include a first microchannel through which a first material can flow and a second microchannel through which a second material can flow. In this case, the first inlet channel and the first microchannel may be connected with each other so that a fluid can flow, and the second inlet channel and the second microchannel may be connected with each other so that a fluid can flow. In addition, the first inlet channel and the second microchannel, or the second inlet channel and the first microchannel may not be connected with each other.

In one embodiment, when several microchannels are connected to one inlet channel, they may be connected by a manifold. Specifically, when the inlet channel serves to supply a first material fluid to a first microchannel and a second microchannel, the inlet channel may be primarily connected with the manifold, and the manifold may have a structure that is connected to the first microchannel and the second microchannel. In this case, the inlet channel may primarily supply the material fluid to the manifold and the manifold may perform a function of distributing the material fluid to the first microchannel and the second microchannel. Further, when the droplet producing chip includes first and second microchannels connected to a first inlet channel, and third and fourth microchannels connected to a second inlet channel, the first inlet channel may be connected to the first and second microchannels by a first manifold, and the second inlet channel may be connected to the third and fourth microchannels by a second manifold.

A junction structure may be formed by connecting two or more of the plurality of microchannels included in the droplet producing chip with each other so that a fluid can flow.

The junction structure may form droplets by interaction of materials flowing through respective microchannels according to microfluidics.

In one embodiment, a T junction may be formed by connecting a first microchannel through which a first material can flow and a second microchannel through which a second material can flow.

In one embodiment, an X junction may be formed by connecting a first microchannel through which a first material can flow and second and third microchannels through which a second material can flow.

In one embodiment, a first junction may be formed by connecting a first microchannel through which a first material can flow with a second microchannel through which a second material can flow, and a second junction may be formed by further connecting a fourth microchannel through which a third material can flow to a microchannel connected in the first junction.

In one embodiment, the junction and the outlet channel may be connected with each other so that a fluid can flow. Specifically, the T junction may be connected with the outlet channel, but the present invention is not limited thereto.

In one embodiment, the first junction and the first outlet channel may be connected, and the second junction and the second outlet channel may be connected. In addition, the first junction and the second outlet channel or the second junction and the first outlet channel may not be connected.

In one embodiment, a plurality of junctions may be connected to one outlet channel.

In one embodiment, one junction may be connected with a plurality of outlet channels.

In one embodiment, an outlet channel may communicate with the outside through a discharge hole formed in all or a part of a sidewall of the droplet producing chip.

In one embodiment, the droplet producing chip may include one or more outlet channels in all or a part of a sidewall.

Connections Between Transport Channels and Other Components—Definition of Terms

Hereinafter, the connections between one or more transport channels included in the microparticle producing system provided herein and other components, and the connection between transport channels will be described in detail.

The transport channel may be connected with a carrier fluid source and a product storage tank, and serves to transport droplets produced by introducing a carrier fluid into the microparticle producing system to the product storage tank from the droplet producing chip. The transport channel corresponds to a path along which the carrier fluid can flow, and thus in the transport channel, a positional relationship may be defined according to the relative distances to the carrier fluid source and the product storage tank.

Hereinafter, the "upstream" used herein or an equivalent expression thereof refers to a region that is closer to a carrier fluid source when there is an imaginary line along which a fluid can flow by connecting a carrier fluid source, a transport channel, and a product storage tank. This may be used when referring to the relative positions of two parts in a transport channel.

Hereinafter, the "downstream" used herein or an equivalent expression thereof refers to a region that is closer to a product storage tank when there is an imaginary line along which a fluid can flow by connecting a carrier fluid source, a transport channel, and a product storage tank. This may be used when referring to the relative positions of two parts in a transport channel.

The term "upstream" or "downstream" includes all other meanings that can be clearly recognized by those of ordinary skill in the art.

Connection Between Carrier Fluid Source and Transport Channel

The microparticle producing system provided herein may include one or more carrier fluid sources and one or more transport channels, and the carrier fluid source may have a certain connection with the transport channel to perform a function of supplying a carrier fluid to the transport channel.

In one embodiment, one carrier fluid source may be connected with each of the plurality of transport channels so that a fluid can flow.

In one embodiment, each of the plurality of carrier fluid sources may be connected with one transport channel so that a fluid can flow.

In one embodiment, the plurality of carrier fluid sources may be connected with the plurality of transport channels so that a fluid can flow.

In one embodiment, the carrier fluid source may be connected so that a fluid can flow through a carrier fluid inlet port included in the transport channel.

In one embodiment, the carrier fluid source may be connected with the transport channel so that a fluid can flow by an adapter.

In one embodiment, the carrier fluid source may be connected with the transport channel so that a fluid can flow by other means that can be appropriately selected by those of ordinary skill in the art.

In one embodiment, the carrier fluid source may be connected with a first transport channel so that a fluid can flow. Here, the first transport channel may have a structure that is separated into a second transport channel and a third transport channel at a portion downstream from the connection point with the carrier fluid source. The second transport channel and the third transport channel may be connected with a outlet channel included in the droplet producing chip at a portion downstream from the separation point so that a fluid can flow. Further, the second transport channel may be connected with an outlet channel included in a first droplet producing chip so that a fluid can flow, and the third transport channel may be connected with an outlet channel included in a second droplet producing chip so that a fluid can flow.

In one embodiment, the carrier fluid source may include a carrier fluid storage tank and a carrier fluid supply pump. In this case, the carrier fluid storage tank and the transport channel may be connected so that a fluid can flow, and the carrier fluid supply pump may be connected with a carrier fluid storage tank to allow a carrier fluid stored in the carrier fluid storage tank to flow to a transport channel by transmitting pressure to the carrier fluid storage tank. Specifically, the carrier fluid supply pump may be a gas pressure pump, a hydraulic pump, or a syringe pump, but the present invention is not limited thereto.

Connection Between Droplet Producing Chip and Transport Channel

The microparticle producing system provided herein may include one or more transport channels, and the transport channel may have a certain connection with a droplet producing chip to introduce a carrier fluid into the microparticle producing system.

An outlet channel and a transport channel included in the droplet producing chip may be connected so that a fluid can flow. Specifically, they may be connected so that a fluid can flow from the outlet channel to the transport channel.

In one embodiment, an outlet hole of the outlet channel may be connected with a discharge fluid inlet port of the transport channel.

In one embodiment, a part of the sidewall including the outlet hole of the outlet channel may be extended to a part through which a carrier fluid can flow in the transport channel.

In one embodiment, the outlet channel and the transport channel may be connected so that a fluid can flow by an adapter.

In one embodiment, the outlet channel and the transport channel may be connected so that a fluid can flow by other means that can be selected by those of ordinary skill in the art.

Since the droplet producing chip may include one or more outlet channels, there may be connections between a plurality of outlet channels and a plurality of transport channels as follows.

In one embodiment, a plurality of outlet channels included in the droplet producing chip may be connected with one transport channel so that a fluid can flow. For example, the plurality of outlet channels may be arranged upstream or downstream of the transport channel and connected with the transport channel so that a fluid can flow. As another example, the plurality of outlet channels are arranged in a direction perpendicular to the direction of fluid flow in the transport channel and connected with the transport channel so that a fluid can flow. The arrangement of the outlet channels, however, is not limited to the above-described examples, and may be appropriately selected by those of ordinary skill in the art.

In one embodiment, one outlet channel included in the droplet producing chip may be connected with the plurality of transport channels so that a fluid can flow. For example, the connection may be made to allow a discharge fluid from one outlet channel to flow through all of the transport channels, but the present invention is not limited thereto.

In one embodiment, the plurality of outlet channels included in the droplet producing chip may be connected with the plurality of transport channels so that a fluid can flow.

Since the microparticle producing system provided herein may include one or more transport channels and one or more droplet producing chips, there may be connections between the plurality of transport channels and the plurality of droplet producing chips as follows.

In one embodiment, one transport channel may be connected with the plurality of droplet producing chips so that a fluid can flow. For example, each of the plurality of droplet producing chips may be arranged upstream or downstream of the transport channel and connected with the transport channel. As another example, the plurality of droplet producing chips may be arranged to a direction perpendicular to fluid flow in the transport channel and connected with the transport channel so that the fluid can flow. However, the arrangement of the plurality of droplet producing chips may not be limited to the above examples, and may be appropriately selected by those of ordinary skill in the art.

In one embodiment, one droplet producing chip may be connected to a plurality of transport channels so that a fluid can flow. For example, a plurality of outlet channels included in the droplet producing chip may each be independently connected with the plurality of transport channels so that a fluid can flow. As another example, the droplet producing chip may be connected with all of the transport channels so that a fluid can flow. However, the present invention is not limited to the above examples.

In one embodiment, the plurality of droplet producing chips may be connected with the plurality of transport channels, respectively.

Connection Between Transport Channel and Product Storage Tank

The microparticle producing system provided herein may include one or more transport channels, and the transport channel may have a certain connection with a product storage tank to transport droplets produced by introducing a carrier fluid into the microparticle producing system to the product storage tank.

The transport channel may be connected with the product storage tank so that a fluid can flow. Specifically, they may be connected by a transport channel outlet, or an adapter, but the present invention is not limited thereto.

Two or more of the plurality of transport channels may be combined into one channel, and then connected with the product storage tank. Specifically, one or more of the transport channels may be combined into one channel at a point downstream from the point connected with an outlet channel of the droplet producing chip, and then connected with the product storage tank.

In one embodiment, each of a first transport channel and a second transport channel may be connected with a discharge channel included in the droplet producing chip, and the first and second transport channels are combined downstream from the connection point, thereby forming a third transport channel, and the third transport channel may be connected with a product storage tank so that a fluid can flow.

Connection Between Sensor and Related Components

The microparticle producing system provided herein may include one or more sensors, and the sensor may serve to measure the properties of a fluid included in the system during the operation of the microparticle producing system. The sensor may operate for a predetermined fluid and have certain connections with a carrier fluid controller and a material controller to measure the properties of the fluid and transfer the measured value to the carrier fluid controller and/or the material controller. Specifically, the sensor may be connected to transmit a measurement signal to the carrier fluid controller and/or the material controller.

The sensor may include a device appropriately selected by those of ordinary skill in the art to measure the properties of a fluid flowing through at least one of inlet channels, an outlet channel, and a transport channel, which are included in the microparticle producing system, and methods for connecting the channels with the device. For example, the sensor may be a flow velocity measuring device that surrounds the outside of the transport channel, but the present invention is not limited thereto.

In one embodiment, at least one sensor may be connected to the inlet channel to measure the properties of a material flowing in the inlet channel. Here, the properties of the material may include at least one of a flow velocity, a flow rate, a temperature, and pressure. Specifically, one or more sensors described above may be connected to measure the properties of a first material flowing through a first inlet channel and/or the properties of a second material flowing through a second inlet channel.

In one embodiment, at least one sensor may be connected with an outlet channel to measure the properties of the discharge fluid flowing through the outlet channel. Here, the properties of the discharge fluid may include at least one of a flow velocity, a flow rate, a temperature, and pressure.

In one embodiment, at least one sensor may be connected with a transport channel to measure the properties of the carrier fluid flowing through the transport channel. Here, the properties of the discharge fluid may include at least one of a flow velocity, a flow rate, a temperature, and pressure.

The at least one sensor may be connected with a carrier fluid controller and/or a material controller to transmit measured values for the properties of the measured fluid.

Method of Controlling Microparticle Producing System

One aspect of the present invention provided herein provides a method of controlling a microparticle producing system.

The method of controlling a microparticle producing system may comprise supplying a carrier fluid to a transport channel; supplying a material comprising at least a first material and a second material to a droplet producing chip to discharge a discharge fluid to the transport channel through an outlet channel, wherein the discharge fluid comprises a material fluid comprising the first material and a droplet comprising the second material, and the droplet is produced from the material in the droplet producing chip; and generating a combined fluid by combining the carrier fluid with the discharge fluid. Here, the process of supplying the carrier fluid to a transport channel may include a process for making the flow rate of the combined fluid larger than that of the discharge fluid.

Further, the method of controlling the microparticle producing system may further comprise transporting the combined fluid to a product storage tank.

Hereinafter, each step will be described in detail.

The process of supplying a material fluid to a droplet producing chip to discharge a droplet to the transport channel through an outlet channel may be a process using a known method selected to produce a droplet in the droplet producing chip, or a method recognized as the same as the selected method, by those of ordinary skill in the art.

The material introduced into the droplet producing chip may include two or more types of immiscible fluids to produce droplets using microfluidics, and at least one of the fluids may include a solvent and a polymer. Specifically, the solvent may be one or more selected from the group consisting of dichloromethane, chloroform, chloroethane, dichloroethane, trichloroethane, and a mixture thereof, and the polymer may be one or more selected from the group consisting of polylactic acid (PLA), polyglycolic acid (PGA), poly(lactic-co-glycolic acid) (PLGA), polycaprolactone (PCL), and a derivative thereof, but the present invention is not limited thereto.

Further, the fluid including the solvent and the polymer may further include an additional material depending on the purpose. Specifically, the additional material may be a pharmaceutical composition or a cosmetic composition, but the present invention is not limited thereto. More specifically, the pharmaceutical composition may be a pharmaceutical composition that includes finasteride, moxidectin, silymarin, donepezil, deslorelin, deoxycholic acid, or dutasteride as an active ingredient, but the present invention is not limited thereto.

In one embodiment, in the process of supplying a material to the droplet producing chip and producing a droplet, the material introduced into the droplet producing chip may include a first material containing a surfactant, and a second material which is immiscible with the first material and contains a solvent and a polymer.

In one embodiment, in the process of supplying a material fluid to the droplet producing chip and producing a droplet, the material introduced into the droplet producing chip may include a first material, a second material which is immiscible with the first material, and a third material which is immiscible with the second material, and at least one of the first material and the second material may include a solvent and a polymer.

In the microparticle producing system, a method of stably transporting the droplets produced in the droplet producing chip to a storage tank, or a device in which a post-processing process takes place is very important because it can affect the yield and shape of microparticles that are finally produced.

Since a curing process is not yet completed, the shape of the droplets is maintained but unstable, and when pressurized, a phenomenon in which the droplets agglomerate or are destroyed occurs.

When such a phenomenon occurs, the finally produced microparticles may have a wide range of sizes, or in severe cases, the phenomenon adversely affects the yield of microparticles, so that microparticle production itself becomes uncertain.

In the microparticle producing systems according to the conventional art, such a phenomenon may occur frequently. One of the fundamental causes of this phenomenon is using only a material introduced to produce droplets when the produced droplets are transported.

Since the flow rate of a material fluid required to produce droplets using microfluidics is very small, the flow rate of the material fluid alone is insufficient to stably transport the produced droplets. The insufficient flow rate of the transported material fluid may not be a major problem when the distance to transport the produced droplets to the storage tank is relatively short or in a laboratory environment where this transport flow can be omitted. However, in a mass-production system, when the transport flow rate is insufficient when the droplets need to be transported a relatively long distance compared to a microchannel length, the above-described problem such as agglomeration between the droplets is prominent. Therefore, it is necessary to provide a means for stably transporting the produced droplets without agglomeration or destruction in the process of constructing a mass-production system for microparticles.

To solve the above-described problem and use a means for stably transporting the droplets, the method of controlling the microparticle producing system provided herein comprises supplying a carrier fluid for transporting droplets to a transport channel.

The carrier fluid used in the process of supplying the carrier fluid to the transport channel is a fluid that prevents the agglomeration between the droplets from occurring and transports the droplets, and the carrier fluid may be appropriately selected according to the type of material fluid.

Specifically, when the material includes a first material, and a second material which is immiscible with the first material and contains a solvent and a polymer, the carrier fluid may be a fluid immiscible with the second material. For example, when the second fluid includes one or more selected from the group consisting of dichloromethane, chloroform, chloroethane, dichloroethane, trichloroethane, and a mixture thereof as a solvent, and one or more selected from the group consisting of polylactic acid (PLA), polyglycolic acid (PGA), poly(lactic-co-glycolic acid) (PLGA), polycaprolactone (PCL), and a derivative thereof as a polymer, the carrier fluid may be water containing a surfactant, but the present invention is not limited thereto.

Specifically, when the material includes a first material, a second material which is immiscible with the first material and contains a polymer and a solvent, and a third material which is immiscible with the second material, the carrier fluid may be a fluid which is immiscible with the second material.

In one embodiment, the carrier fluid may be the same fluid as one of the materials. For example, when the material includes a first fluid, and a second fluid which is immiscible with the first fluid and contains a solvent and a polymer, the material fluid may be the same fluid as the first fluid. As another example, when the material includes a first material, a second material which is immiscible with the first material and contains a polymer and a solvent, and a third material which is immiscible with the second material, the carrier fluid may be a fluid which is the same as the third material.

By introducing the carrier fluid into the microparticle producing system, when the droplets produced in the process of producing microparticles are discharged from the droplet producing chip and move to another location in the producing system, the agglomeration between the droplets may be prevented, the droplets may be more effectively transported in the mass-production process using a plurality of droplet producing chips.

When the carrier fluid is introduced into the microparticle producing system, the most fundamental condition for effectively transporting droplets by the carrier fluid is to control the flow rate of the combined fluid produced by combining the discharge fluid with the carrier fluid to be larger than that of the discharge fluid. This is directly associated with the purpose of introducing the above-described carrier fluid.

Therefore, the method of controlling the microparticle producing system provided herein is a process of generating a combined fluid by combining the carrier fluid with the discharge fluid, and the process of supplying the carrier fluid to a transport channel comprises a process for allowing the flow rate of the combined fluid to be larger than that of the discharge fluid.

Further, when a carrier fluid is introduced into the microparticle producing system, in order for the carrier fluid to effectively and stably transport droplets, a process of controlling the droplets to be stably introduced into the carrier fluid is preferable. Such a controlling process may be a process of controlling the carrier fluid according to the relationship with a discharge fluid—comprising a droplet and a material fluid—discharged through an outlet channel from a droplet producing chip. This may be a process required for safely transporting the produced droplets to a storage tank by the carrier fluid without affecting the droplet production process and without agglomeration or destruction.

Therefore, the method of controlling the microparticle producing system provided herein may comprise a process of controlling a carrier fluid. Specifically, the process of controlling a carrier fluid may be a method of controlling the flow rate of the carrier fluid according to the flow rate of the discharge fluid, but the present invention is not limited thereto.

For example, when the flow rate of the carrier fluid at the time and area of introducing droplets into the carrier fluid is excessively smaller than that of a discharge fluid including the droplets and discharged to a transport channel through an outlet channel in the droplet producing chip, the droplets cannot be stably transported by the carrier fluid. As another example, when the flow rate of the carrier fluid is excessively larger than that of the discharge fluid, depending on the structure of the transport channel, a situation in which the carrier fluid flows backward into the droplet chip may occur. In this case, it may also be difficult for the carrier fluid to stably transport the droplets.

As such, to achieve the purpose of the inflow of the carrier fluid, such as stable transport of the droplets, a process of controlling the method of supplying the carrier fluid is needed. Therefore, the method of controlling the microparticle producing system provided herein may include a process of controlling the method of supplying the carrier fluid. Further, the method may further include not only a process of controlling the carrier fluid supply method, but also a process of controlling one or more components of the microparticle producing system.

In one embodiment, the method of controlling the microparticle producing system provided herein is a process of combining a carrier fluid with a discharge fluid and may include a process of controlling the flow rate of the carrier fluid to be larger than that of the discharge fluid at the time of combining the carrier fluid with the discharge fluid.

The process of introducing the carrier fluid into a transport channel and/or the process of combining the carrier fluid with the discharge fluid may include controlling the method of supplying the carrier fluid, and the method may be controlled by a carrier fluid controller.

Specifically, the controlling of the supply method by the carrier fluid controller may be controlling one or more of the inflow time point, inflow stop time point, inflow time, inflow stop time, an inflow amount, a flow rate, the flow velocity of the carrier fluid in the transport channel, and an inflow location, but the present invention is not limited thereto.

Further, the carrier fluid controller may control a carrier fluid supply pump connected to a carrier fluid storage tank to control the supply method. Specifically, the carrier fluid controller may control one or more of the input pressure, operation time point, and operation time of the carrier fluid supply pump, but the present invention is not limited thereto.

In one embodiment, the process of introducing the carrier fluid into a transport channel may include controlling one or more of the flow rate, inflow amount, inflow time point and inflow time of the carrier fluid so that, when droplets are discharged to the transport channel through an outlet channel, the carrier fluid is supplied to a transport channel at a predetermined flow rate or more.

The method of controlling the microparticle producing system provided herein may further include transporting the combined fluid to a product storage tank.

Since the main purpose of the method of controlling the microparticle producing system is to stably transport produced droplets to a product storage tank, continuous control is required to prevent droplet agglomeration or destruction during the flow of a combined fluid formed by combining a carrier fluid with a discharge fluid to a production storage tank.

In one example, in the process of transporting the combined fluid to a product storage tank, when the combined fluid flows into the product storage tank to exceed the fluid storage capacity of the product storage tank, it may result in a phenomenon in which the combined fluid stagnates in the microparticle producing system or even flows backward, which can be a bad situation for maintaining the shape of droplets included in the combined fluid. This situation may not be important in a batch production system in which the amount of a material used is previously determined but may be a very serious problem in a continuous production system in which a material fluid and a carrier fluid are continuously injected. To prevent this situation, a process of controlling the flow rate of the combined fluid transported to the product storage tank is required.

Therefore, the method of controlling the microparticle producing system provided herein includes controlling the combined fluid not to flow in excess of the fluid storage capacity of the product storage tank.

In one embodiment, the process of introducing the carrier fluid into a transport channel may include a process of controlling one or more of the inflow time point, inflow stop time point, inflow time, inflow stop time, and flow rate of the carrier fluid to a transport channel so as not to exceed the fluid storage capacity of the product storage tank.

Another example may be a case in which a plurality of combined fluids are generated in the microparticle producing system, all or a part of the plurality of combined fluids is combined before being introduced into the product storage tank. In the process of combining all or a part of the plurality of combined fluids, when droplets included in each combined fluid are under excessive pressure or collide, it can be a bad situation for maintaining the shape of the droplets. This phenomenon may appear when there is a section in which turbulence, or a vortex flow occurs in a channel in the process of combining the plurality of combined fluids. In the case using a plurality of droplet producing chips and a plurality of transport channels in a mass-production system, preventing the above phenomenon can be a serious problem.

Therefore, the method of controlling the microparticle producing system provided herein includes controlling each of the combined fluids to maintain a stable laminar flow when a plurality of combined fluids are combined. Specifically, such a controlling process may be achieved by controlling a carrier fluid and/or a discharge fluid included in the combined fluids. Ideally, it is possible to control the combined fluids by controlling parameters of both the carrier fluid and the discharge fluid included in the combined fluids and depending on the configuration of the microparticle producing system, it is possible to control the combined fluids by controlling only parameters of a fluid having a more dominant specific gravity in the combined fluid.

In one embodiment, the method of controlling the microparticle producing system provided herein may include supplying a first carrier fluid to a first transport channel; supplying a material comprising at least a first material and a second material to a first droplet producing chip to discharge a first discharge fluid to a first transport channel through a first outlet channel, wherein the first discharge fluid comprises a first material fluid comprising the first material and a first droplet comprising the second material, the first droplet is produced from the material in the first droplet producing chip; generating a first combined fluid by combining the first carrier fluid with the first discharge fluid; supplying a second carrier fluid to a second transport channel; supplying a material comprising at least the first material and the second material to a second droplet producing chip to discharge a second discharge fluid to a second transport channel through a second outlet channel, the second discharge fluid comprises a second material fluid comprising the first material and a second droplet comprising the second material, the second droplet is produced from the material in the second droplet producing chip; generating a second combined fluid by combining the second carrier fluid with the second discharge fluid; and combining the first combined fluid with the second combined fluid and then transporting the combined fluid to a product storage tank, a carrier fluid controller controls one or more selected from a flow rate and a flow velocity of the first carrier fluid and the second carrier fluid so that the first combined fluid and the second combined fluid maintain a laminar flow when the first combined fluid and the second combined fluid are combined.

In one embodiment, the method of controlling the microparticle producing system provided herein may include supplying a first carrier fluid to a first transport channel; supplying a material comprising at least a first material and a second material to a first droplet producing chip to discharge a first discharge fluid to a first transport channel through a first outlet channel, wherein the first discharge fluid comprises a first material fluid comprising the first material and a first droplet comprising the second material, the first droplet is produced from the material in the first droplet producing chip; generating a first combined fluid by combining the first carrier fluid with the first discharge fluid; supplying a second carrier fluid to a second transport channel; supplying a material comprising at least the first material and the second material to a second droplet producing chip to discharge a second discharge fluid to a second transport channel through a second outlet channel, the second discharge fluid comprises a second material fluid comprising the first material and a second droplet comprising the second material, the second droplet is produced from the material in the second droplet producing chip; generating a second combined fluid by combining the second carrier fluid with the second discharge fluid; and combining the first combined fluid with the second combined fluid and then transporting the combined fluid to a product storage tank, a material controller controls one or more selected from a flow rate and a flow velocity of the first discharge fluid and the second discharge fluid so that the first combined fluid and the second combined fluid maintain a laminar flow when the first combined fluid and the second combined fluid are combined.

In one embodiment, the method of controlling the microparticle producing system provided herein may include supplying a first carrier fluid to a first transport channel; supplying a material comprising at least a first material and a second material to a first droplet producing chip to discharge a first discharge fluid to a first transport channel through a first outlet channel, wherein the first discharge fluid comprises a first material fluid comprising the first material and a first droplet comprising the second material, the first droplet is produced from the material in the first droplet producing chip; generating a first combined fluid by combining the first carrier fluid with the first discharge fluid; supplying a second carrier fluid to a second transport channel; supplying a material comprising at least the first material and the second material to a second droplet producing chip to discharge a second discharge fluid to a second transport channel through a second outlet channel, the second discharge fluid comprises a second material fluid comprising the first material and a second droplet comprising the second material, the second droplet is produced from the material in the second droplet producing chip; generating a second combined fluid by combining the second carrier fluid with the second discharge fluid; and combining the first combined fluid with the second combined fluid and then transporting the combined fluid to a product storage tank, the carrier fluid controller controls one or more selected from a flow rate and a flow velocity of the first carrier fluid and the second carrier fluid, and the material controller controls one or more selected from a flow rate and a flow velocity of the first discharge fluid and the second discharge fluid so that the first combined fluid and the second combined fluid maintain a laminar flow when the first combined fluid and the second combined fluid are combined.

In one aspect of the present invention provided herein, a method of controlling a microparticle producing system including the following processes is provided: supplying a carrier fluid to a transport channel; supplying a material including at least a first material and a second material to a droplet producing chip to discharge a discharge fluid to the transport channel through an outlet channel, wherein the discharge fluid includes a material fluid including the first material and droplets including the second material, and the droplets are generated from the material in the droplet producing chip; controlling whether the droplets included in the discharge fluid come into contact with air when the discharge fluid is discharged to the transport channel through the outlet channel; and generating a combined fluid by combining the carrier fluid with the discharge fluid.

In the process of finally producing microparticles from the droplets, it is very important to extract a solvent contained in the droplet for curing the droplet and evaporating the solvent. At this time, whether the droplet comes into contact with air is an important variable affecting the extraction and evaporation rate of the solvent.

For example, when the solvent is volatile, when the droplet comes into contact with the air, the rate of evaporating the solvent from the droplet becomes very fast. Since the fast solvent evaporation rate of the droplet does not always have a good effect on the shape of the finally produced microparticles, it is necessary to appropriately control whether or not the droplet comes into contact with air, and a contact time thereof when it comes into contact with air in consideration of the content of a polymer constituting the droplet, the properties of the final microparticles to be targeted or the like.

In the process of controlling whether the droplet comes into contact with air, when in contact with air, the controlling of the contact time may be performed independently, but when this can be controlled together with the process of discharging the droplet to a transport channel, this process may be more effectively controlled.

According to such necessity, the method of controlling a microparticle producing system provided herein may include a process of controlling whether or not the droplets come into contact with air when the droplets are discharged to an outlet channel.

The process of controlling whether or not the droplets come into contact with air when being discharged to a transport channel through an outlet channel may specifically include optionally controlling one of the state in which the droplets are discharged to a transport channel through an outlet channel without contact with air and introducing them into a carrier fluid and the state in which the droplets are discharged in contact with air and then introduced into a carrier fluid; and controlling the contact time when the state in which the droplets are in contact with air is selected during this process.

In one embodiment, the process of controlling whether or not the droplets come into contact with air when being discharged to a transport channel through an outlet channel may be controlled by a carrier fluid controller. Specifically, in the controlling process, whether or not to come into contact with air when the droplets are discharged to a transport channel through an outlet channel may be determined by controlling any one or more selected from the inflow time point, inflow stop time point, inflow time, introduction stop time, inflow amount and flow rate of the carrier fluid, the flow velocity thereof in the transport channel, and an inflow location, but the present invention is not limited thereto.

In one embodiment, the process of controlling whether or not the droplets come into contact with air when being discharged to a transport channel through an outlet channel may be controlled by adjusting the distance between the droplet producing chip and the transport channel.

In one embodiment, the process of controlling whether or not the droplets come into contact with air when being discharged to a transport channel through an outlet channel may be to predetermine that the droplets are discharged without contact with air and introduce them into a carrier fluid, and to control the microparticle producing system to maintain the above-described state.

In one embodiment, the process of controlling whether or not the droplets come into contact with air when being discharged to a transport channel through an outlet channel may be to predetermine that the droplets are discharged while being in contact with air and then introduce them into a carrier fluid, and to control the microparticle producing system to maintain the above-described state.

In one embodiment, the process of controlling whether or not the droplets come into contact with air when being discharged to a transport channel through an outlet channel may be to select whether the droplets are in contact with air after discharging, and to control the microparticle producing system to achieve the selected state. Further, the preselected state may be changed to a different state, and therefore the microparticle producing system may be controlled to achieve the changed state.

Specifically, the controlling of the microparticle producing system to achieve the selected state may be to control a method of supplying a carrier fluid introduced into a transport channel by the carrier fluid controller, and the controlling of the supply method may be to control one or more selected from the inflow time point, inflow stop time point, inflow time, inflow stop time, inflow amount and flow rate of the carrier fluid, the flow velocity thereof in the transport channel, and an inflow location, but the present invention is not limited thereto.

Herein after, the present invention provided herein will be described in further detail with reference to the following examples.

Figure 7:
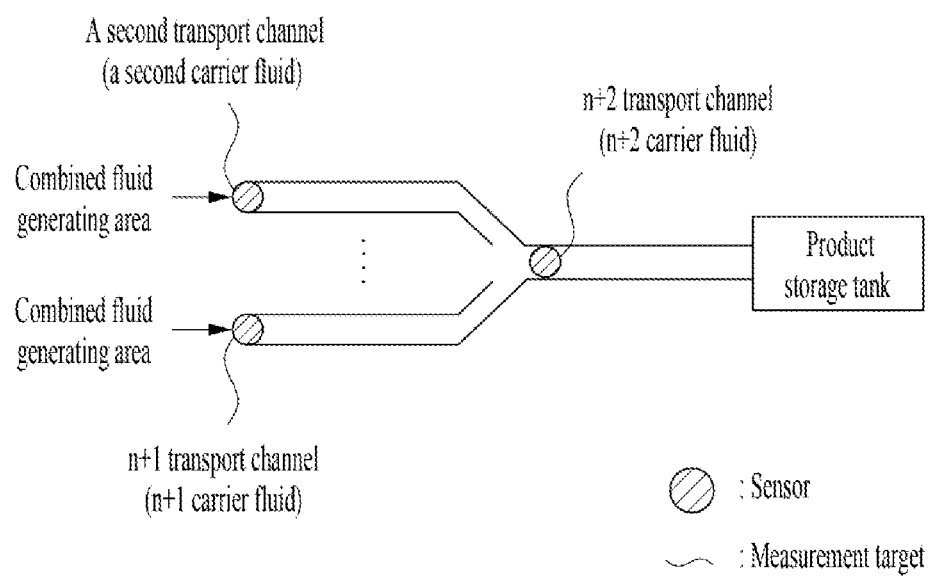
FIG. 7 shows the connection relationship when a sensor is connected to the transport channel in FIG. 6B.

The specification has been described in more detail with reference to examples. The examples are merely provided to describe the specification more fully, and it will be obvious to those of ordinary skill in the art that the scope of the present invention is not limited to the above examples.

EXAMPLES

[Example 1] Microparticle Producing System

Components and Connection Structures Between Components

FIG. 2 is a diagram showing components of a microparticle producing system provided in Example 1 and the interactions between the components. A first material storage tank and a second material storage tank may be connected with a droplet producing chip to supply a first material and a second material to the droplet producing chip through a first inlet channel and a second inlet channel, respectively. In addition, the first material storage tank and the second material storage tank may be connected with a first material supply pump and a second material supply pump, respectively, and each material supply pump may supply pressure to each material storage tank. Further, a material controller may be connected to transmit a control signal to the first material supply pump and the second material supply pump. Meanwhile, a transport channel is connected with a carrier fluid storage tank, which is connected with a carrier fluid supply pump to receive pressure, to supply a carrier fluid to the transport channel. A carrier fluid controller is connected to transmit a control signal to the carrier fluid supply pump.

The droplet producing chip receives the first material and the second material and discharges a discharge fluid. Here, the discharge fluid includes droplets containing the second material and the first material. The discharge fluid is discharged to a transport channel from a droplet producing chip and combined with a carrier fluid in the discharge fluid-combining area in the transport channel to generate a combined fluid. The transport channel may be connected to allow a fluid to flow from the discharge fluid-combining area to the product storage tank, and the combined fluid is transported to the product storage tank. The transport channel serves as a path for transporting the combined fluid from the discharge fluid-combining area to the product storage tank.

In the process described above, the driving forces for the flow of the carrier fluid, the discharge fluid, and the combined fluid are a pressure supplied to the carrier fluid storage tank by the carrier fluid supply pump and a pressure supplied to the first and second material storage tanks by the material supply pumps. The supplied pressures may be controlled by the material controller and the carrier fluid controller.

As one form of the microparticle producing system provided in this example, a component for transmitting the state of each part, measured by a sensor, is shown in FIG. 3 (material storage tanks and some of their peripheral components will be omitted). As shown in FIG. 3, one or more sensors may be installed to measure the properties of a fluid at a part where the first material and the second material are introduced, a part where the discharge fluid is discharged to the transport channel, a part where the carrier fluid is supplied to the transport channel, and/or a part where the combined fluid is generated and transferred to the product storage tank, respectively. The properties of a fluid measured by a sensor include one or more of the flow rate, flow velocity, temperature and pressure of the fluid.

The sensor may be connected with the carrier fluid controller to transmit the properties of the fluid to the carrier fluid controller in the form of measured values. The carrier fluid controller may receive the measured values from the one or more sensors and reflect the measured values in the process of determining a carrier fluid control signal.

Connection Structure of Transport Channel with Carrier Fluid Source or Product Storage Tank FIG. 4 shows structures in which a transport channel is connected with a carrier fluid storage tank according to the example. The transport channel and the carrier fluid storage tank may be directly connected as shown in FIG. 4A, and as shown in FIG. 4B, the carrier fluid storage tank may be directly connected with a first transport channel that receives a carrier fluid, and the first transport channel may be separated into second to n+1 transport channels respectively connected with the droplet producing chips and the product storage tanks.

As shown in FIG. 5, the first transport channel may be connected with a plurality of sensors. The sensors may be for measuring the properties of the carrier fluid in the first transport channel. The properties of the carrier fluid measured by the sensors may be one or more selected from a flow velocity, a flow rate, a temperature, and a pressure.

FIG. 6 shows structures in which a transport channel is connected with a product storage tank according to the example. The transport channel and the product storage tank may be directly connected as shown in FIG. 6A, or a separate transport channel may be connected with a droplet producing chip, and a second transport channel to an n+1 transport channel, which transport a combined fluid from each discharge fluid-combining area, may be combined with a n+2 transport channel and connected to a product storage tank, as shown in FIG. 6B.

As shown in FIG. 7, the second transport channel to the n+1 transport channel may be connected with a plurality of sensors at a point upstream of the discharge fluid-combining area. The sensors may be for measuring the properties of the combined fluid in the second to n+1 transport channel. The properties of the combined fluid, which are measured by the sensors, may be one or more selected from a flow velocity, a flow rate, a temperature, and pressure.

As shown in FIG. 7, the n+2 transport channel may be connected with a plurality of sensors. The sensors may be for measuring the properties of the combined fluid in the n+2 transport channel. The properties of the combined fluid measured by the sensors may be one or more selected from a flow velocity, a flow rate, a temperature, and pressure.

Hereinafter, Examples 2 and 3 show more specific configurations of Example 1, and Example 4 shows the method of controlling a microparticle producing system of the present application. Hereinafter, unless stated otherwise for each example, Examples 2 to 4 include configurations and connections between them, which are the same as or equivalent to those in Example 1.

[Example 2] 2D Array

Structure of Droplet Producing Chip

Figure 8:
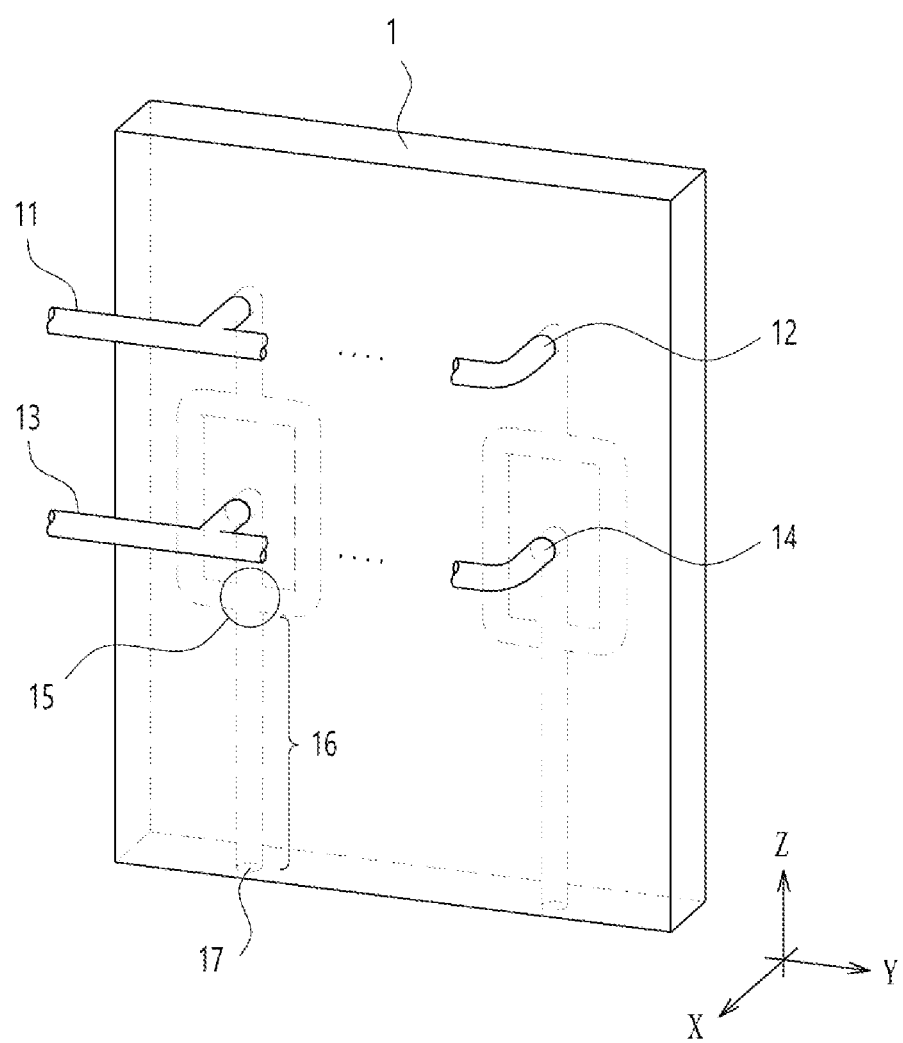
FIG. 8 shows a droplet producing chip according to Example 2.

FIG. 8 shows the droplet producing chip (1) used in this example. The droplet producing chip includes a first material inlet channel (11), a second material inlet channel (13), a first material inlet hole (12), a second material inlet hole (14), a microchannel, a junction (15), an outlet channel (16) and an outlet hole (17). A first material and a second material are supplied to the first material inlet hole (12) and the second material inlet hole (14) through the first material inlet channel (11) and the second material inlet channel (13), respectively, and a microchannel connected to one first material inlet port and a microchannel included at one second material inlet port are combined at the junction (15) part and connected with the outlet channel (16). Specifically, FIG. 8 shows an X-shaped junction structure, but this is merely an example, and is not particularly limited as long as it is any structure that can produce droplets by applying microfluidic technology. Droplets containing a second material are produced by a first material and the second material meeting at the junction, and a discharge fluid containing the droplets and the first material is prepared. The discharge fluid flows through the outlet channel (16) and is discharged out of the droplet producing chip through the outlet hole (17). Since the droplet producing chip includes a plurality of microchannels, when the first material and the second material are received through a plurality of inlet ports, the discharge fluid containing the produced droplets is discharged through a plurality of outlet channels.

The droplet producing chip may be connected with a plurality of sensors. The sensors may be for measuring the properties of the first material and/or the second material in the first material inlet channel (11) and/or the second material inlet channel (13). The properties of the first material and/or the second material measured by the sensors may be one or more selected from a flow velocity, a flow rate, a temperature, and a pressure.

Figure 9:
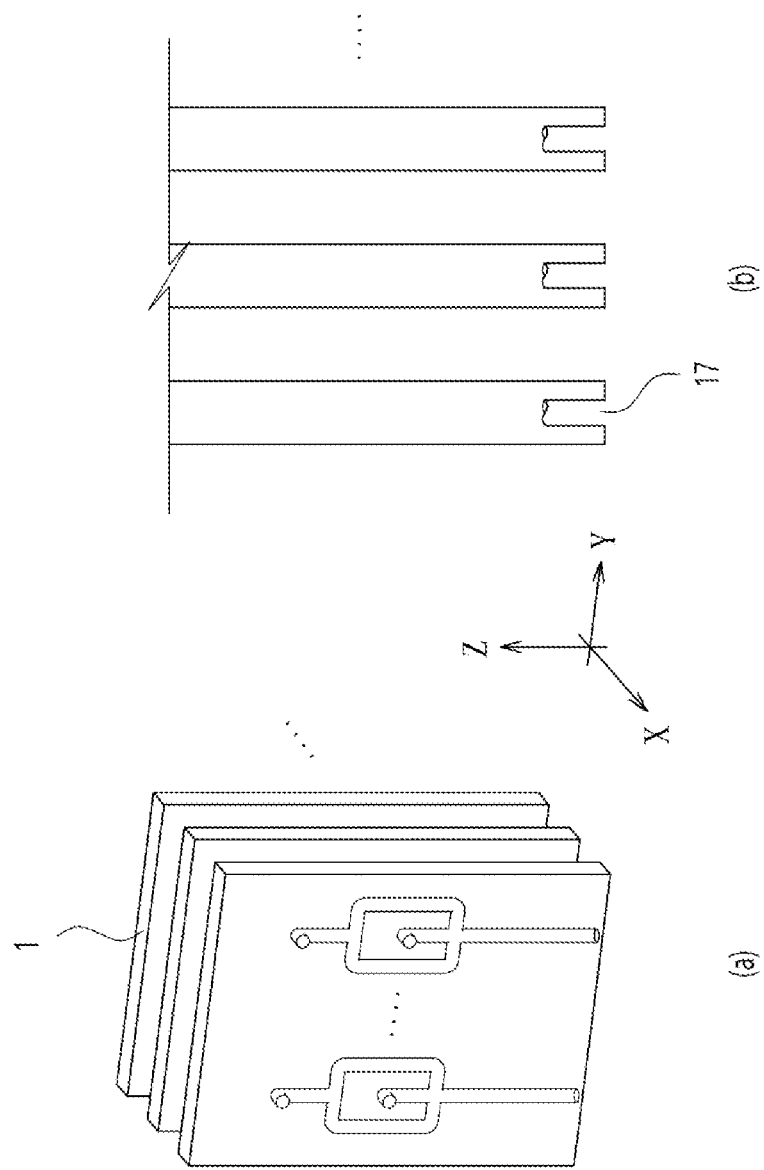
FIG. 9 shows that a plurality of droplet producing chips are arranged at regular intervals according to Example 2.

The microparticle producing system of this example may include a plurality of droplet producing chips (1). In addition, the plurality of droplet producing chips may be regularly arranged. One example of the arrangements is shown in FIG. 9. The droplet producing chips may be formed in a rectangular plate shape or an equivalent shape and may be arranged at regular intervals. As shown in FIG. 9, when the outlet channels are arranged in the Y-axis direction, the droplet producing chips may be arranged in the X-axis direction, but the present invention is not limited thereto.

Structures of Carrier Fluid Storage Tank, Carrier Fluid Supply Pump, and Carrier Fluid Controller In this example, the carrier fluid storage tank serves to store a carrier fluid, and the shape and structure thereof may be appropriately selected by those of ordinary skill in the art. The carrier fluid storage tank may be directly connected with the transport channel so that a fluid can flow.

In this example, the carrier fluid supply pump may be connected with the carrier fluid storage tank, and the shape and structure of the carrier fluid supply pump may be appropriately selected by those of ordinary skill in the art to perform a function of supplying pressure to the carrier fluid storage tank so that the carrier fluid can flow in the transport channel connected with the carrier fluid storage tank. For example, the carrier fluid supply pump may be a commercial gas pressure pump or syringe pump, but the present invention is not limited thereto.

Figure 6:
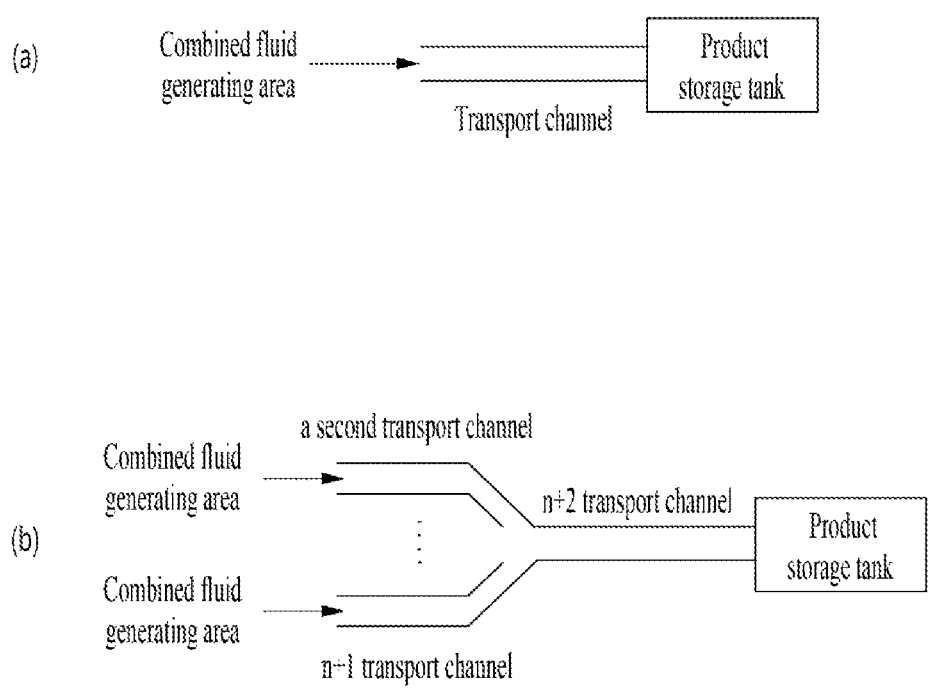
FIG. 6 shows the connection relationship between the product storage tank and a transport channel according to Example 1.
Figure 10:
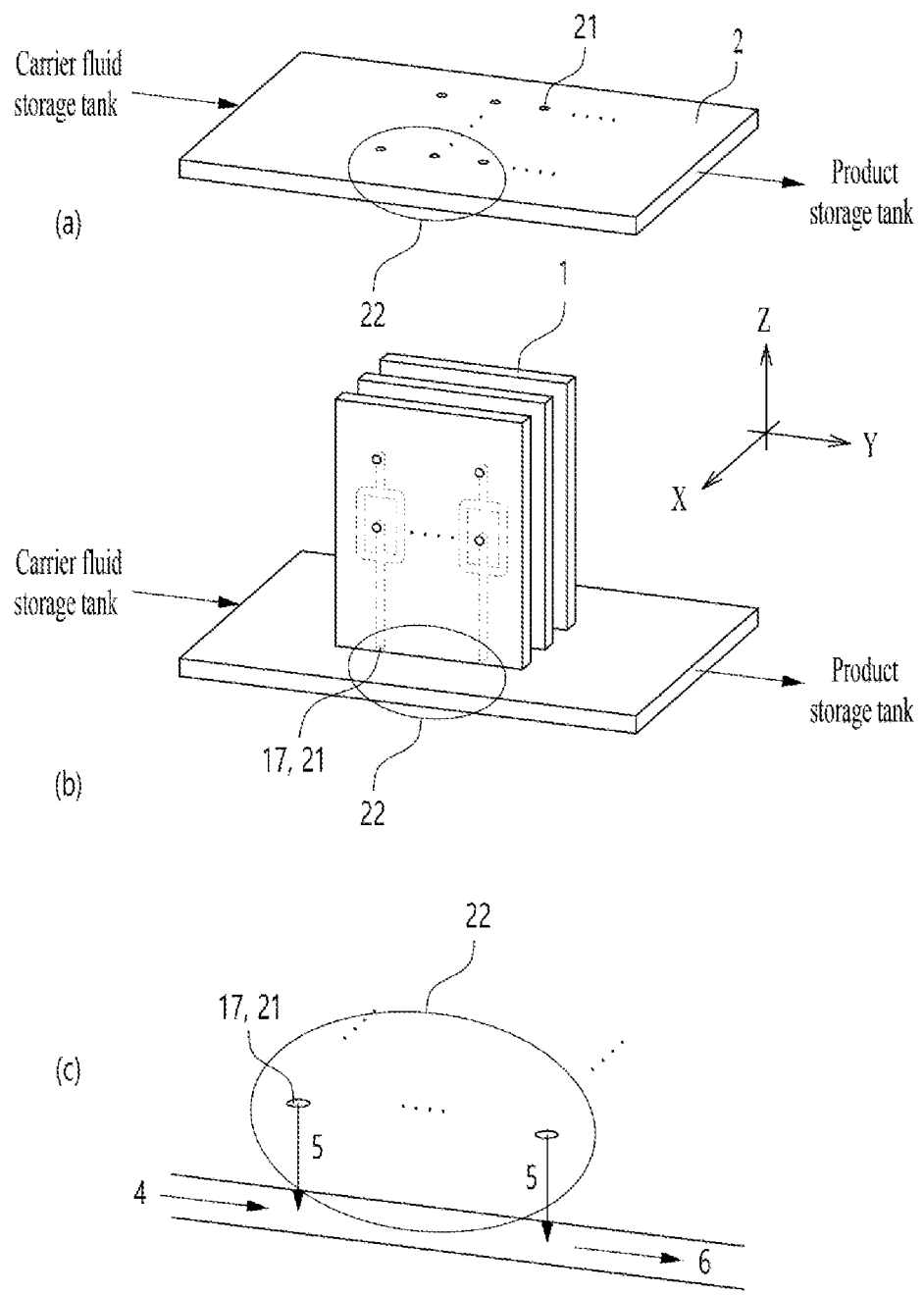
FIG. 10 shows a part of the transport channel according to Example 2.

Transport Channel Structure and Connection Structure Between Droplet Producing Chip and Transport Channel The structure of the transport channel (2) used in this example is shown in FIG. 10. FIG. 10 shows a part of the structure in which the transport channel is connected with the droplet producing chip. In this drawing, the transport channel is formed in a rectangular prismatic shape, this is merely exemplary and an appropriate structure that can allow a carrier fluid, a discharge fluid, and a combined fluid to flow may be selected. The transport channel may be connected with the carrier fluid storage tank at an upstream part, and may be connected with the product storage tank at a downstream part. In addition, in the region in which the transport channel is connected with the droplet producing chip, the transport channel may include a discharge fluid inlet port (21) into which the discharge fluid can be introduced. FIG. 10B shows a part of the structure in which the transport channel is connected with the plurality of droplet producing chips. In FIG. 10B, it is exemplified that the plurality of droplet producing chips are arranged in the X-axis direction, but the present invention is not limited thereto. The plurality of droplet producing chips may be arranged in the Y-axis direction and can be expanded as needed. Exemplarily, although the outlet hole (17) of the droplet producing chip is directly connected with the discharge fluid inlet port (21) of the transport channel in FIG. 6B, the present invention is not limited thereto. For example, the droplet producing chip may be connected with the transport channel by an adapter. A discharge fluid discharged from the droplet producing chip (1) may be introduced into the transport channel (2) through the discharge fluid inlet port, and the introduced discharge fluid (5) and the carrier fluid (4) flowing upstream are combined at the discharge fluid-combining area (22), thereby forming a combined fluid (6) (FIG. 10C).

The transport channel may be connected with a plurality of sensors at the carrier fluid measuring area, which is upstream of the discharge fluid-introducing area. The sensors may be for measuring the properties of the carrier fluid in the transport channel at the carrier fluid measuring area. The properties of the carrier fluid measured by the sensors may be one or more selected from a flow velocity, a flow rate, a temperature, and pressure.

[Example 3] Circular Array

Overview of Structures of Transport Channel and Droplet Producing Chip

Figure 11:
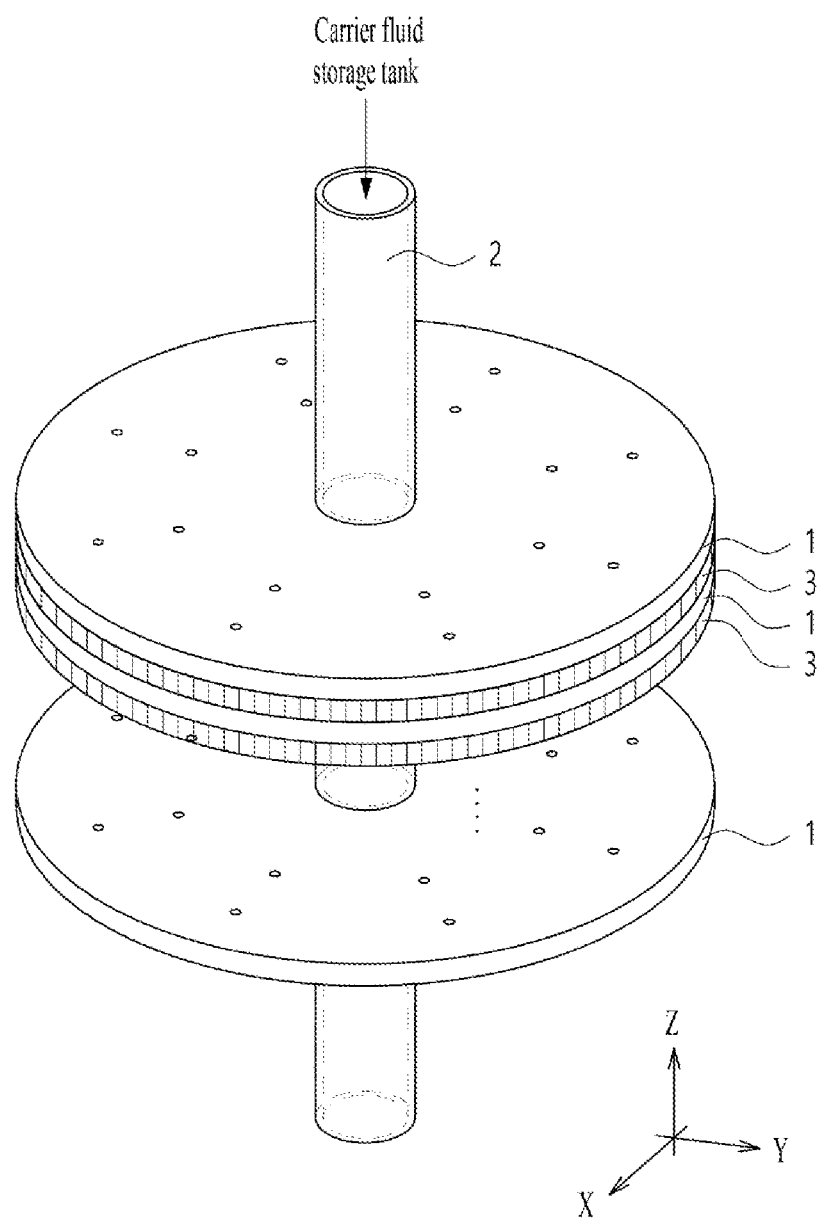
FIG. 11 shows that the plurality of droplet producing chips are connected to a transport channel according to Example 3.

FIG. 11 is a schematic diagram illustrating the structures and shapes of a transport channel and droplet producing chips according to Example 3. The carrier fluid storage tank may be connected with a carrier fluid storage tank at an upstream part ((+) Z direction in FIG. 11) and connected with a product storage tank at a downstream part of the combining area with the droplet producing chip ((−) Z direction in FIG. 11). The transport channel may be connected with a plurality of droplet producing chips and spacers, which are disposed in an upstream to downstream direction, and the transport channel may be connected in the form of passing through the center of the plurality of droplet producing chips.

The connection between the transport channel and the carrier fluid storage tank in Example 3 has been described in Example 1, and the connection between the transport channel and the product storage tank has also been described in Example 1, and the structure may be appropriately adopted by those of ordinary skill in the art.

Hereinafter, the component structures and connection structures therebetween in this example will be described in further detail.

Structure of Droplet Producing Chip

Figure 12:
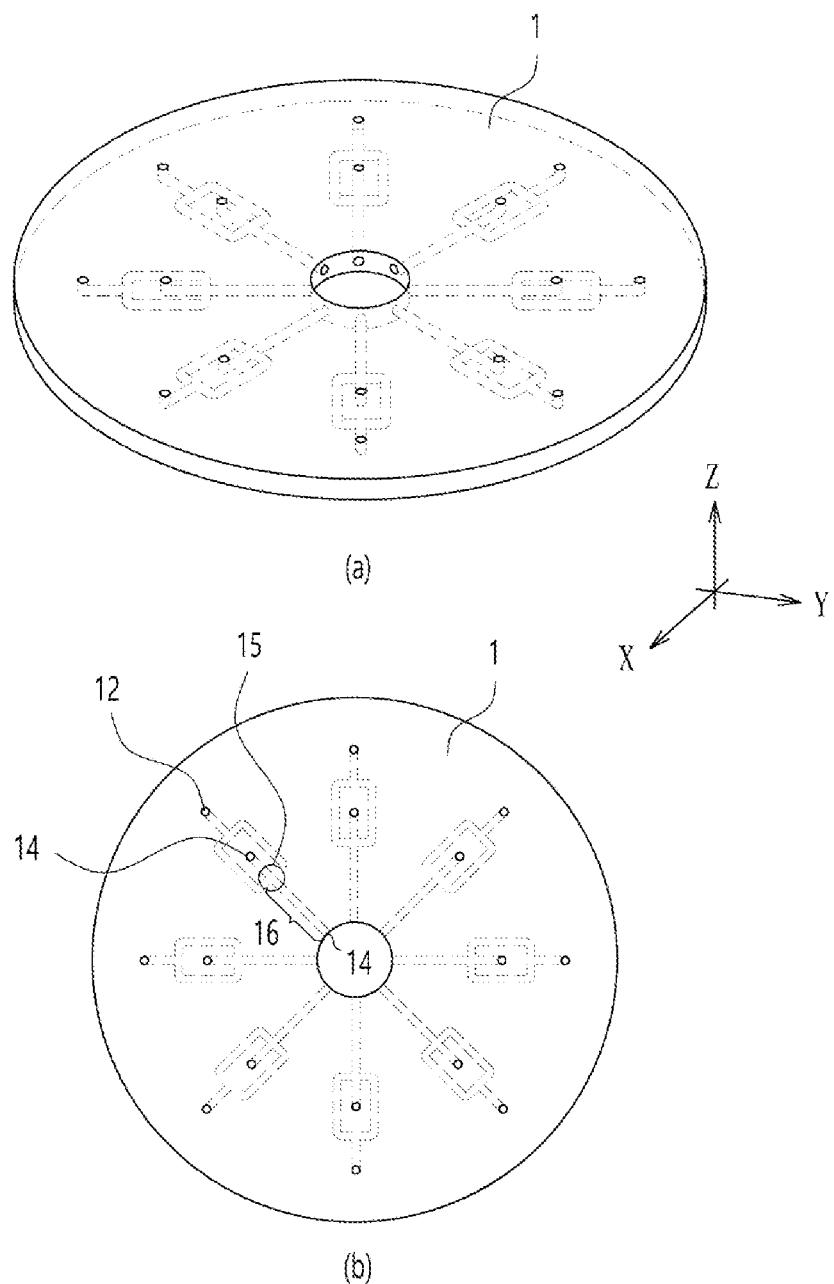
FIG. 12 illustrates a droplet producing chip according to Example 3.

An exemplary droplet producing chip in this example is shown in FIG. 12. The droplet producing chip includes a first inlet channel, a second inlet channel (omitted in the drawing), a first material inlet port (12), a second material inlet port (14), a microchannel, a junction (15), an outlet channel (16) and an outlet hole (17). A microchannel connected to one first material inlet port and a microchannel included at one second material inlet port are combined at the junction part and connected with the outlet channel. Specifically, although FIG. 9 shows an X-shaped junction structure, this is merely exemplary and is not particularly limited as long as it has any structure in which droplets can be produced by applying microfluidic technology. At the junction, a first material and a second material meet and droplets containing the second material are produced, and a discharge fluid containing the droplets and the first material is formed. The discharge fluid flows through the outlet channel and is discharged out of the droplet producing chip through an outlet hole. Since the droplet producing chip includes a plurality of microchannels, when a first material and a second material are received through a plurality of inlet ports, the discharge fluid containing the produced droplets is discharged through a plurality of outlet channels.

In addition, as shown in FIG. 12B, when viewing from one side, the droplet producing chip has an empty space in the center, by which an inner wall and an outer wall are separated. The first and second inlet channels, and microchannels respectively connected thereto may be formed relatively outward (the region close to the outer wall) based on the center in which the empty space is formed, and the junction (15) and the outlet channel (16) are formed relatively inward based on the center. In addition, the outlet hole (17) connected to the outlet channel is formed in the inner wall. In this drawing, although it is shown that the droplet producing chip has an annular structure, this is merely exemplary, and the present invention is not limited thereto. The droplet producing chip may have a shape that satisfies the above-described conditions and is appropriately selected by those of ordinary skill in the art.

The droplet producing chip may be connected with a plurality of sensors. The sensors may be for measuring the properties of the first material and/or the second material in the first inlet channel and/or the second inlet channel. The properties of the first material and/or the second material, which are measured by the sensors, may be one or more selected from a flow velocity, a flow rate, a temperature, and pressure.

Figure 13:
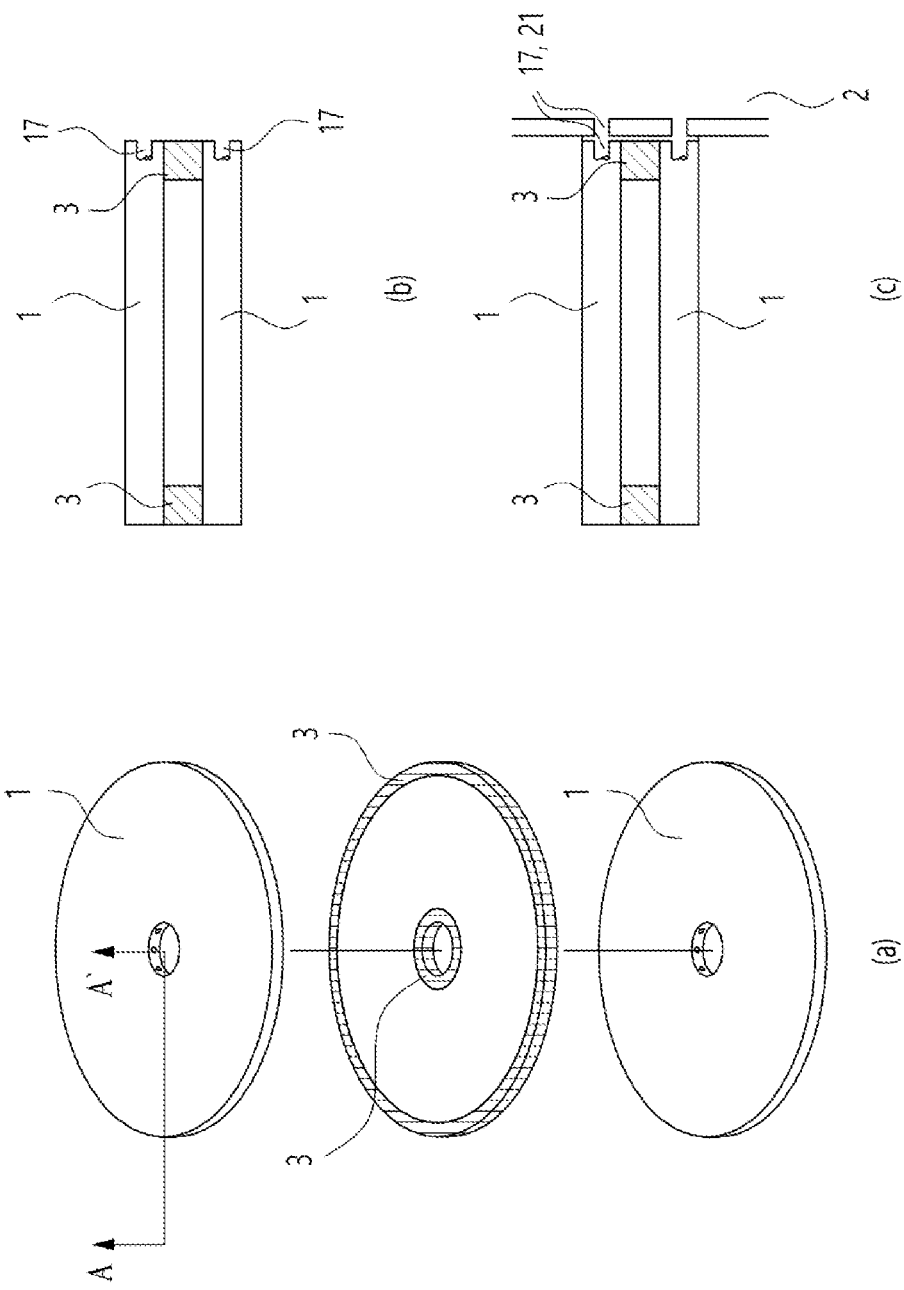
FIG. 13 shows that a spacer is interposed between a first droplet producing chip and a second droplet producing chip according to Example 3.

FIG. 13 shows a structure in which the plurality of droplet producing chips provided in this example are disposed in parallel using spacers. As shown in FIG. 13A, the plurality of droplet producing chips may be connected in the Z-axis direction using spacers (3). A first droplet producing chip and a second droplet producing chip are disposed above and below using spacers, and the inner wall of the first droplet producing chip and the inner wall of the second droplet producing chip are aligned with each other, and when viewed from one side, the empty spaces in the center overlap in the Z-axis direction. Although FIG. 13 shows an annular spacer, this is merely exemplary, and the structure may be appropriately selected by those of ordinary skill in the art to make the empty spaces in the center overlap in the Z-axis direction when viewed from one side and be disposed in parallel.

As shown in FIGS. 13B and 13C, the inner space of the inner walls of the first droplet producing chip and the second droplet producing chip itself may serve as a transport channel through which a carrier fluid flows, in addition, a transport channel may pass through the inner space of the inner walls.

As shown in FIG. 15A, the first droplet producing chip may include a plurality of a first material intermediate supply channel (111) and a second material intermediate supply channel (131). The first material intermediate supply channel (111) and the second material intermediate supply channel (131) may supply a material to the underlying second droplet producing chip through a first material spacer inlet channel (31) and a second material spacer inlet channel (32), which are included in the spacer (3). Specifically, the droplet producing chip supplies the first material and the second material supplied from the first inlet channel (11) and the second inlet channel (13) through the plurality of the first material intermediate supply channel (111) and the second material intermediate supply channel (131), which are formed on the side wall of the lower part in contact with a spacer to the second droplet producing chip located below through the spacer inlet channels (31 and 32).

Further, the second droplet producing chip may include the plurality of the first material intermediate supply channel (111) and the second material intermediate supply channel (131) (FIG. 15B).

Structure of Transport Channel

The transport channel provided in this example passes through the inner space of the inner walls of the plurality of droplet producing chips and may have a shape that is appropriately selected by those of ordinary skill in the art to form a combined fluid including a carrier fluid and a discharge fluid by introducing the discharge fluid discharged from a plurality of outlet holes.

As shown in FIG. 14, the transport channel may include a discharge fluid inlet port. This is merely an example, and the discharge fluid discharged from the droplet producing chips may be introduced into the transport channel through a structure other than the discharge fluid inlet port. In one example, the discharge fluid may be introduced into the transport channel by an adapter connected to the outlet port, but the present invention is not limited thereto.

As shown in FIG. 13C, the inner space of the inner walls of the plurality of droplet producing chips disposed in parallel through the spacers (3) may have a shape through which the transport channel (2) passes. As shown in FIG. 13C, the shapes and dimensions of the inside of the inner walls of the plurality of droplet producing chips, and the space blocked by the spacers 3, and the shape and dimension of the transport channel (2) may be designed to be connected without gaps within an error range. Here, an outlet hole (17) formed in the inner wall of the droplet producing chip and a discharge fluid inlet port (21) of the carrier fluid may be connected to each other to introduce the discharge fluid discharged from the droplet producing chip into the carrier fluid.

In one example provided herein, the inner space of the inner walls and the space blocked by the spacers themselves may be transport channels. Here, the transport channel may further include a sealant to prevent leakage of a fluid from a part where the droplet producing chip and the spacer are in contact with each other.

In one example provided herein, the transport channel may be formed as a hollow tube. As another example, the transport channel may include a longitudinal core structure (23) in the center. The core structure (23) structurally prevents the introduction of a carrier fluid at a large flow rate, which is difficult to control in the microparticle producing system in this example, into the transport channel by physically limiting the volume in the transport channel. One example of the core structure (23) is shown in FIG. 14B. Specifically, the transport channel may include a cylindrical core structure (23), but the present invention is not limited thereto. The transport channel may have a structure appropriately selected by those of ordinary skill in the art to exhibit the above-described function.

[Example 4] Method of Controlling Carrier Fluid

The method of controlling a microparticle producing system provided herein relates to a method of controlling a control signal transmitted to each supply pump by each of the material controller and/or the carrier fluid controller.

Method of Supplying Material

The method of controlling a microparticle producing system provided herein includes supplying a first material and a second material to a droplet producing chip and discharging a discharge fluid from the droplet producing chip to a transport channel. Referring to the configuration of Example 1 described above, the process of supplying a first material and a second material to the droplet producing chip may be controlled by appropriately determining a control signal sent from the material controller.

The droplet producing chip may be designed to have a structure that can produce droplets from the first material and the second material using microfluidics. According to the structures and dimensions of the microchannels included in the droplet producing chip, and the structure of a junction, which is the part where the droplets are formed by combining the microchannels, flow rates of the first material and the second material in the microchannels for producing droplets with optimal efficiency are determined.

Accordingly, the process of discharging a discharge fluid from the droplet producing chip to a transport channel by supplying a first material and a second material included in this example may be to supply the first material and the second material at a flow rate predetermined from the shape, material, structure, and dimensions of the droplet producing chip.

Method of Controlling Carrier Fluid
Overview of Method of Controlling Carrier Fluid The method of controlling a microparticle producing system provided herein includes supplying a carrier fluid into a transport channel of the microparticle producing system and forming a combined fluid by combining the supplied carrier fluid with the discharge fluid. Referring to Example 1 described above, the supplying of a carrier fluid into a transport channel and the forming of a combined fluid by combining the supplied carrier fluid with the discharge fluid may be controlled by appropriately determining a control signal sent to the carrier fluid supply pump from the carrier fluid controller.

To achieve the purpose of the method of controlling a microparticle producing system provided herein—to stably transport droplets produced in a droplet producing chip to a product storage tank-, this example may include transmitting the predetermined control signal to the carrier fluid supply pump by the carrier fluid controller to make the flow rate of the combined fluid larger than that of the discharge fluid.

To achieve the purpose, it is possible to control the carrier fluid by transmitting the predetermined control signal, but since the operation situation of the microparticle producing system may change in real time, it is more preferable to measure it in an appropriate form and reflect the form in the controlling method.

Figure 16:
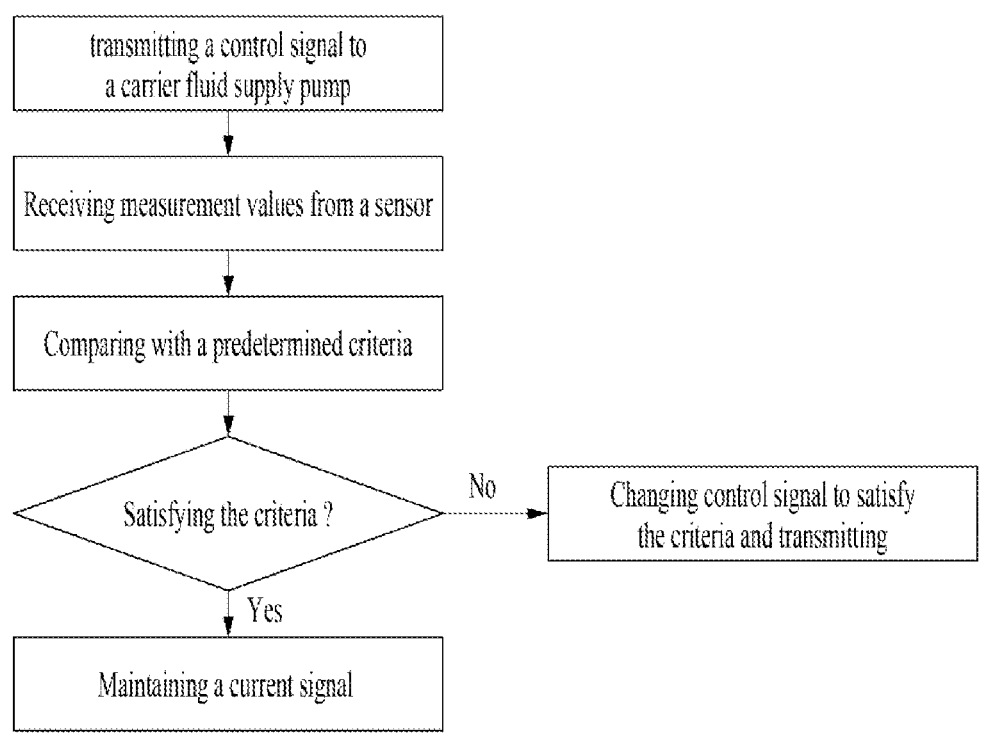
FIG. 16 shows a flowchart illustrating methods for receiving a measurement value from a sensor and reflecting it in controlling a microparticle producing system according to Example 4.

FIG. 16 illustrates a process in which the carrier fluid controller receives a measured value from the one or more sensors and reflects the measured value in determining a carrier fluid control signal. The carrier fluid controller continuously transmits a control signal to a carrier fluid supply pump. While the control signal is transmitted, the carrier fluid controller receives measured values for the properties of the material, discharge fluid, carrier fluid and/or combined fluid from the one or more sensors. The carrier fluid controller compares the received measured values, or numerical values deduced from the measured values with the predetermined criteria depending on the purpose. When the measured values or the numerical values deduced from the measured values satisfy the predetermined criteria, the control signal currently being sent is maintained as it is. When the measured values or the numerical values deduced from the measured values do not satisfy the predetermined criteria, a control signal is changed and transmitted to satisfy the criteria. The series of processes of collecting measured values from the one or more sensors and determining whether the transmittance of the current control signal is maintained or a changed control signal is transmitted may be repeated as many times as needed according to a predetermined frequency during the operation of the microparticle producing system, and through this repetition, the purpose of controlling the carrier fluid may be achieved.

Hereinafter, a more detailed controlling method according to the purpose of controlling the carrier fluid will be described.

Method of Supplying Carrier Fluid at Certain Flow Rate or More for Stable Transport of Droplets The method of controlling a microparticle producing system provided herein may include controlling a carrier fluid to become a state in which the carrier fluid is supplied to a predetermined flow rate or more to the transport channel when a discharge fluid is discharged to a transport channel through an outlet channel.

The purpose of the present invention including the above-described process is for the droplet combines with the carrier fluid stably forming a laminar flow so that the agglomeration or destruction of droplets is prevented by supplying the carrier fluid at a predetermined flow rate or more when the discharge fluid containing droplets is discharged to the transport channel.

Figure 17:
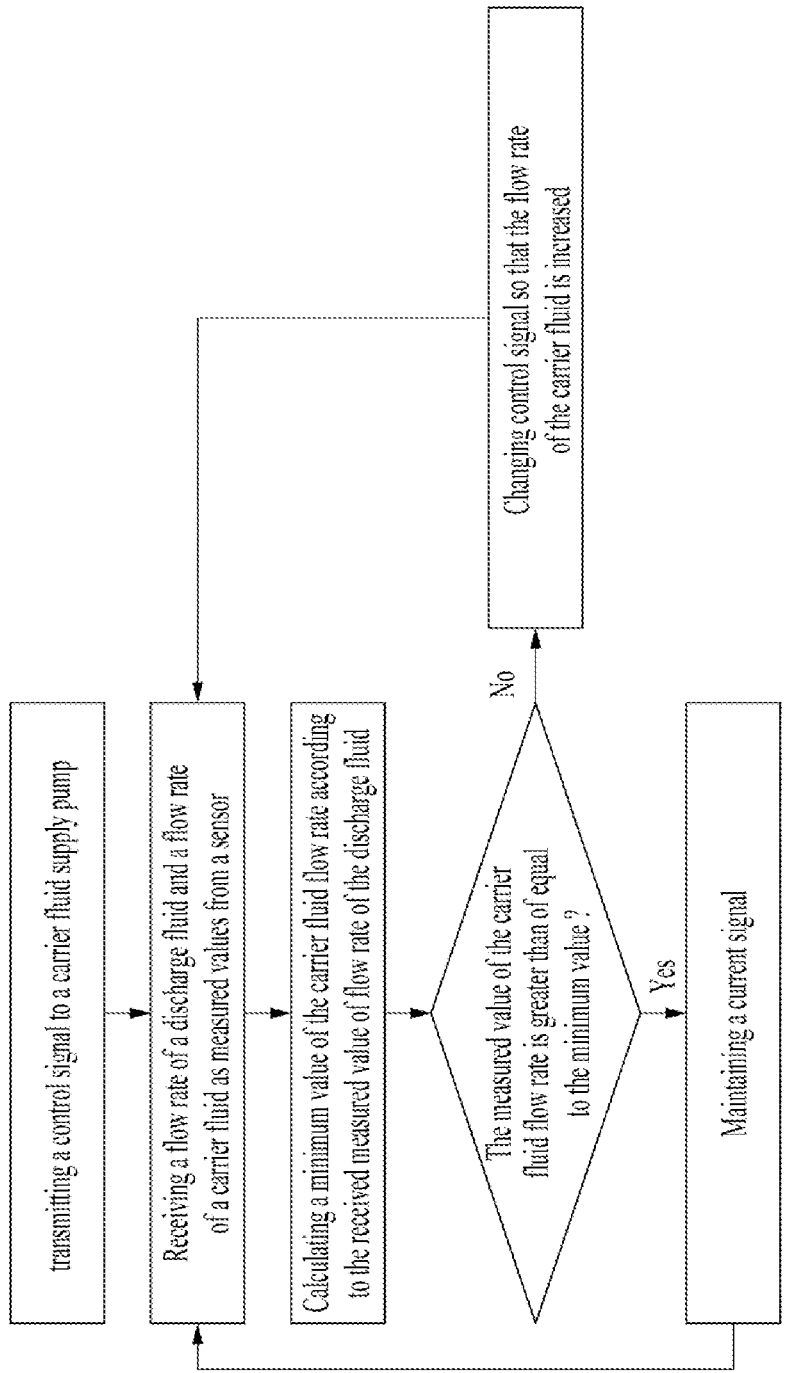
FIG. 17 shows a flowchart illustrating methods for measuring the flow rate of a discharge fluid and the flow rate of a carrier fluid, calculating the minimum value of the flow rate of the carrier fluid in relation to the flow rate of the discharge fluid, and thus controlling the flow rate of the carrier fluid to the minimal value or more according to Example 4.
Figure 18:
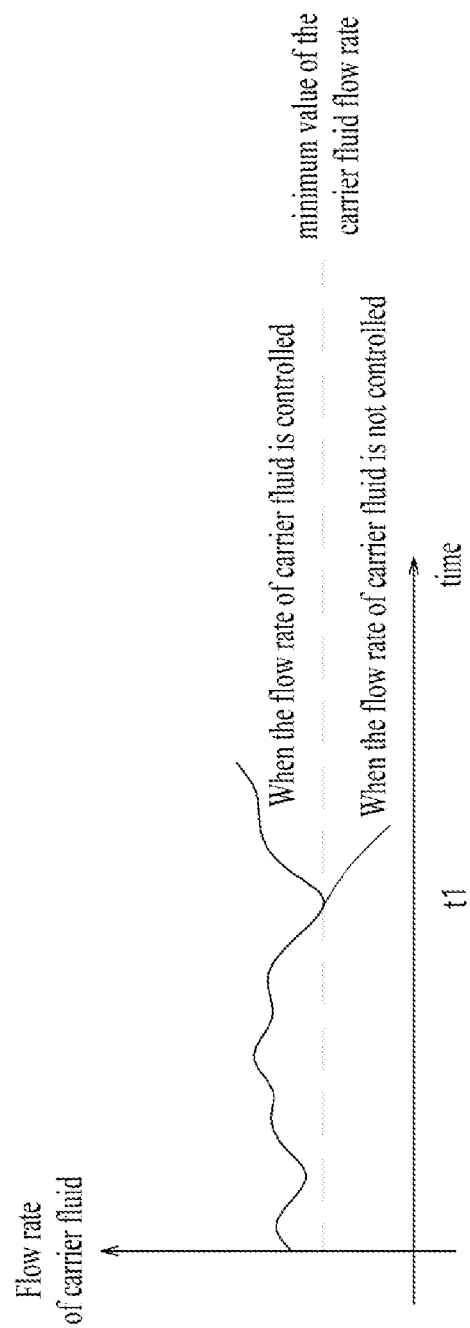
FIG. 18 is a graph exemplifying the flow rate of a carrier fluid over time when the controlling method according to FIG. 17 is applied.

FIGS. 17 and 18 show a controlling process of a carrier fluid becoming a state in which the carrier fluid is supplied at a predetermined flow rate or more to the transport channel when a discharge fluid is discharged to a transport channel through an outlet channel and a graph of a flow rate of the carrier fluid—time when the controlling process is applied. The carrier fluid controller transmits a control signal for continuously supplying a specific flow rate of carrier fluid to a carrier fluid supply pump. The carrier fluid controller receives a flow rate of the discharge fluid and a flow rate of the carrier fluid as measured values from a sensor that can measure the flow rates of the discharge fluid and carrier fluid. The carrier fluid controller calculates the minimum value of the carrier fluid flow rate required for stable transport of droplets according to the received flow rate of the discharge fluid. The carrier fluid controller determines whether the received measured value of the flow rate of the carrier fluid is greater than or equal to the minimal value of the calculated flow rate. When the measured value of the carrier fluid flow rate is greater than or equal to the minimum value of the calculated flow rate, the carrier fluid controller maintains the currently transmitted control signal. When the measured value of the carrier fluid flow rate is smaller than the minimum value of the calculated flow rate, the carrier fluid controller changes a control signal so that the flow rate of the carrier fluid is higher than the minimum value of the calculated flow rate. When the method of controlling a carrier fluid provided herein is applied, a graph of the flow rate of the carrier fluid—time is shown in FIG. 18. When the flow rate of the carrier fluid reaches the minimum value of the calculated flow rate (t1 point of FIG. 18), and when the method of controlling a carrier fluid is applied (when the carrier fluid flow rate is controlled), the carrier fluid flow rate is controlled so that the carrier fluid controller changes a control signal to be greater than or equal to the minimal value of the calculated flow rate, whereas when the controlling method of this example is not applied (when the carrier fluid flow rate is not controlled), the flow rate of the carrier fluid falls below the minimum value of the calculated flow rate, and thus a problem of the agglomeration or destruction of droplets may occur.

Method of Supplying Carrier Fluid at Less than Certain Flow Rate to Prevent Carrier Fluid Backflow Phenomenon The method of controlling a microparticle producing system provided in this example may include controlling a carrier fluid to have a state in which the carrier fluid is supplied at less than the predetermined flow rate to the transport channel when a discharge fluid is discharged the transport channel through an outlet channel.

The purpose of the present invention including the above-described process is to prevent the phenomenon of the backflow of the carrier fluid into the outlet channel of the droplet producing chip by maintaining a state in which the carrier fluid is supplied at the predetermined flow rate or less when the discharge fluid including a droplet is discharged to a transport channel.

Figure 19:
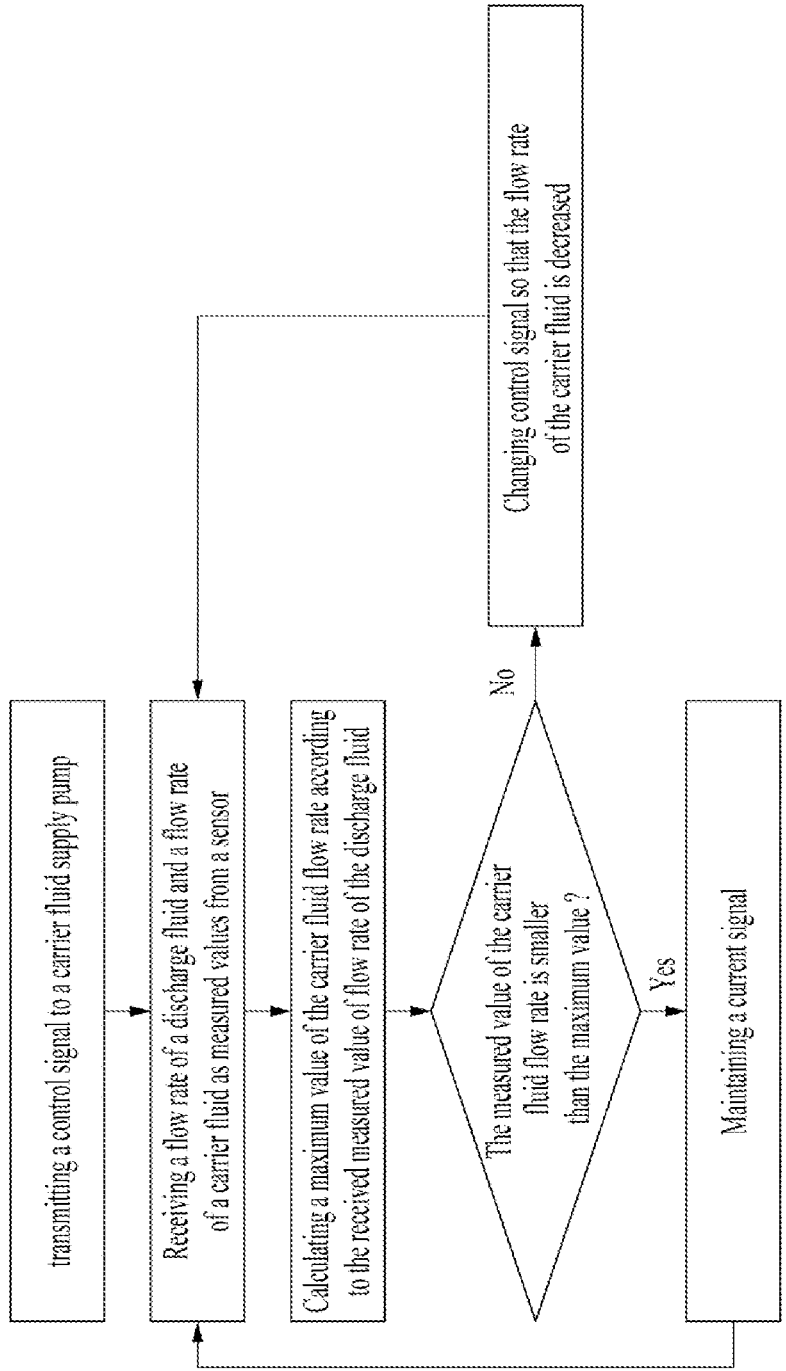
FIG. 19 is a flowchart illustrating methods for measuring the flow rate of a discharge fluid and the flow rate of a carrier fluid, calculating the maximum value of the flow rate of the carrier fluid in relation to the flow rate of the discharge fluid, and thus controlling the flow rate of the carrier fluid to less than the maximum value according to Example 4.
Figure 20:
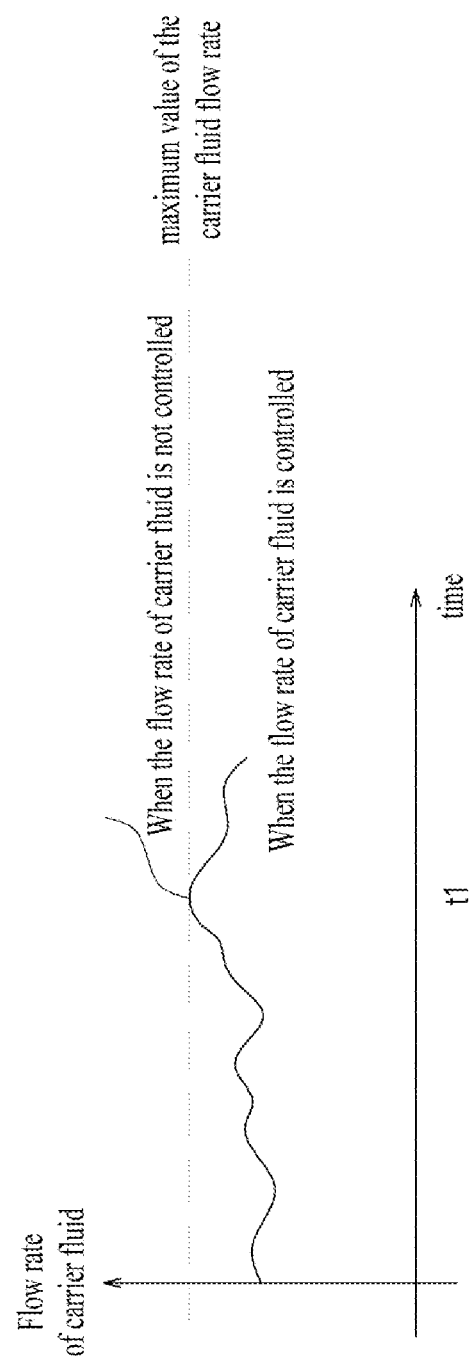
FIG. 20 is a graph exemplifying the flow rate of a carrier fluid over time when the controlling method according to FIG. 19 is applied.

FIGS. 19 and 20 shows the process of controlling a carrier fluid to have a state in which the carrier fluid is supplied at less than the predetermined flow rate to the transport channel when a discharge fluid is discharged the transport channel through an outlet channel and a graph of a flow rate of the carrier fluid—time when the controlling process is applied. The carrier fluid controller transmits a control signal for continuously supplying a specific flow rate of carrier fluid to a carrier fluid supply pump. The carrier fluid controller receives a flow rate of the discharge fluid and a flow rate of the carrier fluid as measured values from a sensor that can measure the flow rates of the discharge fluid and carrier fluid. The carrier fluid controller calculates the maximum value of the flow rate of carrier fluid at which the carrier fluid does not flow back to the outlet channel according to the received flow rate of the discharge fluid. The carrier fluid controller determines whether the received flow rate of the carrier fluid is smaller than the maximum value of the calculated flow rate. When the measured value of the carrier fluid flow rate is smaller than the maximum value of the calculated flow rate, the carrier fluid controller maintains the currently transmitted control signal. When the measured value of the carrier fluid flow rate is greater than or equal to the maximum value of the calculated flow rate, the carrier fluid controller changes a control signal so that the flow rate of the carrier fluid is smaller than the maximum value of the calculated flow rate. When the method of controlling a carrier fluid provided in this example is applied, a graph of the flow rate of the carrier fluid—time is shown in FIG. 20. When the flow rate of the carrier fluid reaches the maximum value of the calculated flow rate (t1 point of FIG. 20), and when the method of controlling a carrier fluid is applied (when a carrier fluid flow rate is controlled), the carrier fluid controller changes a control signal to control the carrier fluid flow rate to be less than the minimum value of the calculated flow rate, whereas when the controlling method of this example is not applied (when the carrier fluid flow rate is not controlled), the flow rate of the carrier fluid may exceed the maximum value of the calculated flow rate and thus a problem of the backflow of the carrier fluid may occur.

Method of Supplying Carrier Fluid so as not to Exceed Storage Capacity of Product Storage Tank The method of controlling a microparticle producing system provided in this example may include controlling the method of supplying a carrier fluid so as not to exceed the fluid storage capacity of the product storage tank in the process of transporting a combined fluid to the product storage tank.

The purpose of the present invention including the above-described process is to prevent the combined fluid to be supplied from exceeding the fluid storage capacity of the product storage tank during the production of microparticles to prevent the agglomeration or destruction of droplets included in the combined fluid, and to prevent the microparticle producing system from being damaged.

In the above process, the combined fluid includes a discharge fluid discharged from a droplet producing chip and a carrier fluid. Since the discharge fluid includes droplets containing a first material and a second material, the properties of the discharge fluid such as its flow rate and flow velocity depend on the flow rates and flow velocities of the first material and the second material supplied to the droplet producing chip. However, as described above, since the first material and the second material must be supplied under a condition that the droplets can be generated in the droplet producing chip, the ranges of the flow rate and the flow velocity are inevitably limited by being influenced by the shape, dimensions, and structure of the droplet producing chip. Accordingly, to control the flow rate and the flow velocity of the combined fluid, it is more preferable to control the flow rate and the flow velocity of the carrier fluid.

Figure 21:
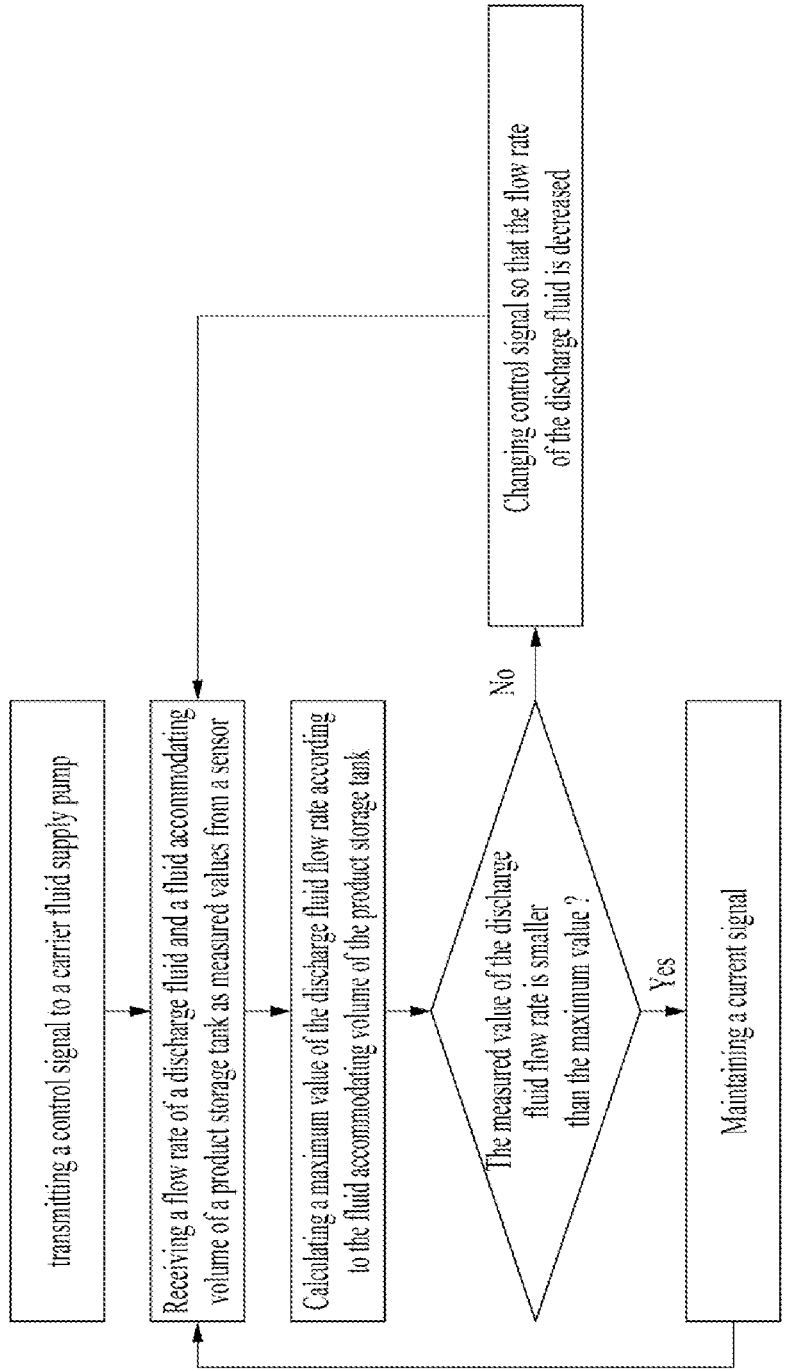
FIG. 21 is a flowchart illustrating methods for measuring the fluid accommodating volume of a product storage tank and the flow rate of a combined fluid, calculating the maximum value of the flow rate of the combined fluid in relation to the fluid accommodating volume of the product storage tank, and thus controlling the flow rate of a combined fluid to less than the maximum value according to Example 4.

FIG. 21 shows the process of controlling the method of supplying a carrier fluid so as not to exceed the fluid storage capacity of the product storage tank in the process of transporting the combined fluid to the product storage tank. The carrier fluid controller transmits a control signal for continuously supplying a carrier fluid at a specific flow rate to the carrier fluid supply pump. The carrier fluid controller receives a flow rate of the combined fluid, a flow rate of the carrier fluid, and a fluid accommodating volume of the product storage tank as measured values from sensors that can measure them. The carrier fluid controller calculates the maximum value of the flow rate of the carrier fluid according to the received flow rate of the combined fluid and the fluid accommodating volume of the product storage tank. The carrier fluid controller compares the calculated maximum value and the received measured value of the carrier fluid flow rate. When the measured value of the carrier fluid flow rate is smaller than the calculated maximum value, the carrier fluid controller maintains the current control signal. When the measured value of the carrier fluid flow rate is greater than or equal to the calculated maximum value, the carrier fluid controller changes the control signal so that the carrier fluid flow rate becomes smaller than the calculated maximum value.

Figure 22:
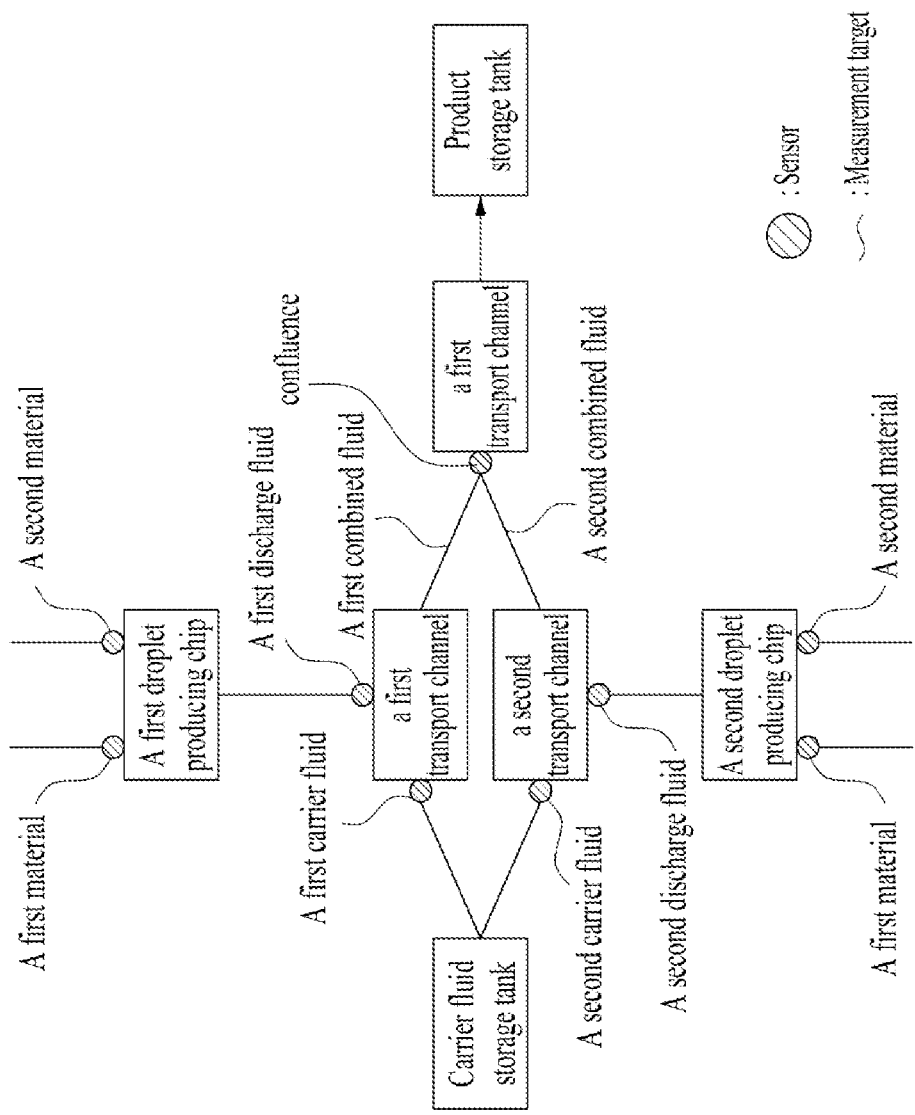
FIG. 22 is a schematic diagram showing components and the connections between the components when a microparticle producing system includes a plurality of transport channels according to Example 4.

Method of Maintaining Laminar Flow at Confluence of Transport Channels when Plurality of Transport Channels are Used When the microparticle producing system provided herein includes one or more transport channels, the connections between components are shown in FIG. 22. In this case, a first combined fluid and a second combined fluid are combined in a third transport channel, and during this combining process, a process of controlling the first and second combined fluids to maintain a laminar flow is needed.

Accordingly, the method of controlling a microparticle producing system provided in this example includes, in the process of transporting a combined fluid to a product storage tank, controlling the first combined fluid and the second combined fluid to maintain a laminar flow at the confluence of the first combined fluid and the second combined fluid.

The purpose of the present invention including the above-described process is to prevent the agglomeration or destruction of droplets contained in the first and second combined fluids due to turbulence when the first combined fluid and the second combined fluid are combined in the third transport channel.

As described above, in the above process, the combined fluid includes a discharge fluid discharged from a droplet producing chip and a carrier fluid. Since the discharge fluid includes droplets containing a first material and a second material, the properties of the discharge fluid, such as its flow rate and flow velocity, depend on the flow rates and flow velocities of the first material and the second material supplied to the droplet producing chip. However, as described above, since the first material and the second material must be supplied under a condition that the droplets can be produced in the droplet producing chip, the ranges of the flow rate and the flow velocity are inevitably limited by the influence of the shape, dimensions, and structure of the droplet producing chip.

Therefore, to control the flow rate and flow velocity of the combined fluid, it is more preferable to control the flow rate and flow velocity of the carrier fluid.

Figure 23:
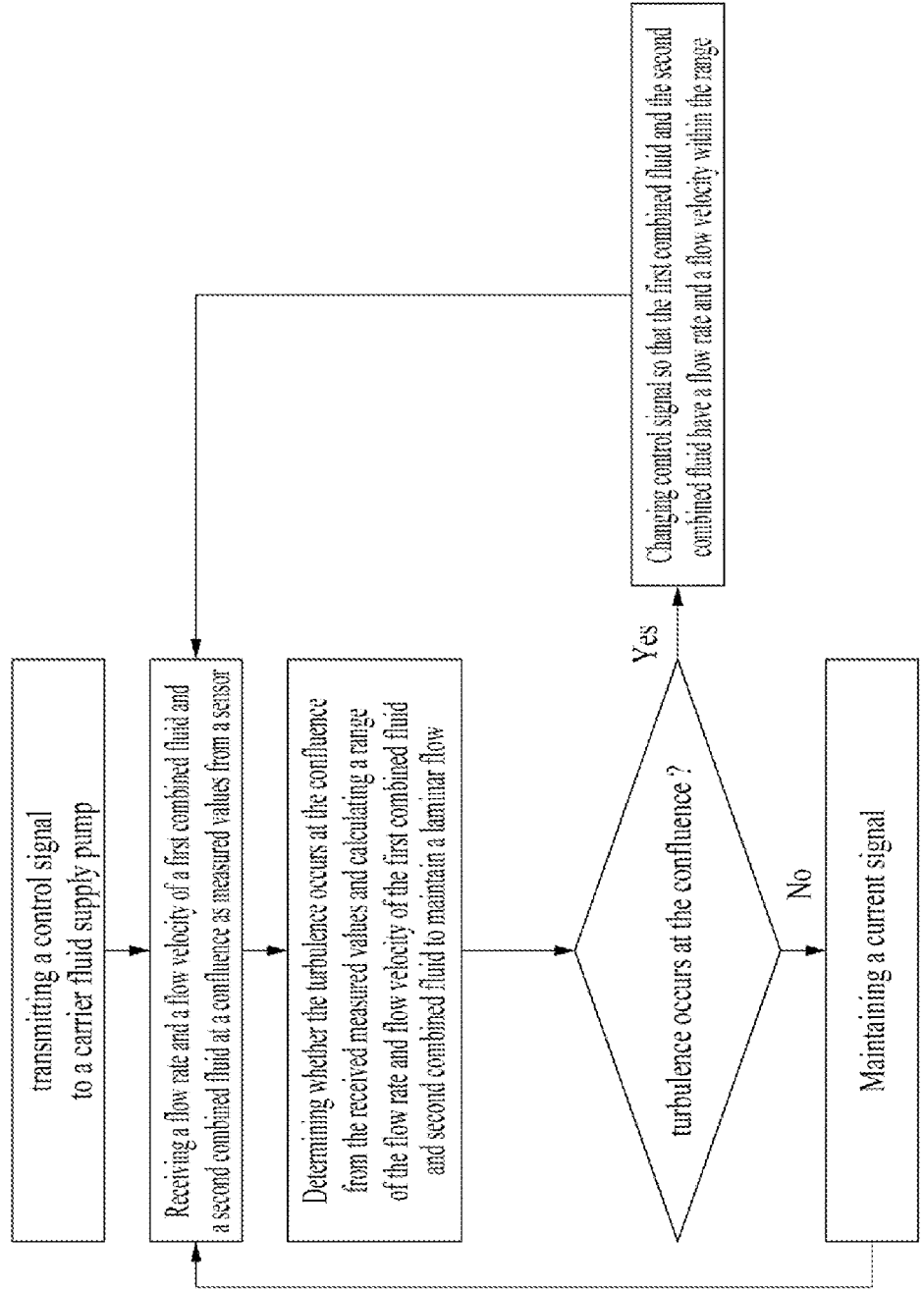
FIG. 23 is a flowchart illustrating methods for receiving measurement values for the flow rates and flow velocities of a first carrier fluid and a second carrier fluid at a confluence in relation to the microparticle producing system shown in FIG. 21 according to Example 4, determining whether turbulence is formed at the confluence from the measurement values, and thus controlling the flow rates of the first carrier fluid and the second carrier fluid not to form turbulence.

FIG. 23 shows the process of controlling the first combined fluid and second combined fluid to maintain a laminar flow at the confluence of the first combined fluid and second combined fluid in the process of transporting the combined fluid to a product storage tank. The carrier fluid controller continuously transmits a control signal to a carrier fluid supply pump so that a first carrier fluid and a second carrier fluid are supplied at specific flow rates and flow velocities. The carrier fluid controller receives the properties of the combined fluid, including the flow rates and flow velocities of the first combined fluid and the second combined fluid as measured values from sensors that can measure the properties of the first combined fluid and second combined fluid flowing at the confluence. The carrier fluid controller determines whether turbulence occurs at the confluence from the received measured values. When it is determined that no turbulence occurs, the carrier fluid controller maintains the current control signal. When it is determined that turbulence occurs, the carrier fluid controller calculates the ranges of the flow rates and flow velocities of the first combined fluid and second combined fluid so that the first combined fluid and second combined fluid maintain laminar flows at the confluence. The carrier fluid controller calculates the flow rates and flow velocities of the first carrier fluid and second carrier fluid so that the first combined fluid and second combined fluid have the calculated flow rates and flow velocities. Finally, the carrier fluid controller transmits a control signal changed based on the calculated values.

EXPLANATION OF REFERENCE NUMERALS 1 chip
11 a first material inlet channel
12 a first material inlet hole
13 a second material inlet channel
14 a second material inlet hole
15 a junction
16 an outlet channel
17 an outlet hole
2 a transport channel
21 a discharge fluid inlet port
22 a discharge fluid-combining area
23 a core structure
3 a spacer
31 a first material injection
32 a second material injection
4 a carrier fluid
5 a discharge fluid
6 a combined fluid

INDUSTRIAL APPLICABILITY

The present specification provides a microparticle producing system using microfluidics and a controlling method thereof. According to the present invention disclosed herein, an industrially usable system for stably transporting droplets produced using microfluidics without agglomeration or destruction, and a controlling method thereof are provided. By the microparticle producing system and the controlling method thereof, which are disclosed herein, droplets produced by the microparticle producing system using microfluidics may be stably transported without agglomeration or destruction, resulting in more effective microparticle production.

The invention claimed is:
1. A method of controlling a microparticle producing system, the method comprising:
supplying a carrier fluid to a transport channel;
supplying one material comprising at least a first material and a second material to a droplet producing microfluidic chip to form a discharge fluid discharging to the transport channel through an outlet channel of the chip,
wherein the discharge fluid comprises a material fluid comprising the first material and a droplet comprising the second material, and
wherein the droplet is produced from the one material in the droplet producing chip;
generating a combined fluid by combining the carrier fluid with the discharge fluid in the transport channel,
wherein the supplying the carrier fluid to the transport channel causes a flow rate of the combined fluid to be larger than that of the discharge fluid; and producing a microparticle from the droplet by controlling whether the droplet comes into contact with air before the discharge fluid and the carrier fluid are combined, wherein the controlling whether the droplet comes into contact with air is achieved through a carrier fluid controller configured to control one or more selected from an inflow time point, an inflow stop time point, an inflow time, an inflow stop time, an inflow amount, and a flow rate of the carrier fluid, a flow velocity of the carrier fluid in the transport channel, and an inflow location of the carrier fluid.

2. A microparticle producing system comprising:
a first droplet producing microfluidic chip, wherein the first droplet producing chip comprises an inlet channel, a microchannel, a junction, and a first outlet channel;
a transport channel;
a carrier fluid source; and
a carrier fluid controller;
wherein the first outlet channel and the transport channel are in fluid connection with one another,
wherein the carrier fluid source and the transport channel are in fluid connection with one another,
wherein the carrier fluid controller is configured to transmit a control signal to the carrier fluid source for producing microparticles from the droplets by controlling whether or not the droplets come into contact with air,
wherein the transport channel is for transporting a discharge fluid comprising a material and a droplet discharged from the first droplet producing chip to a product storage tank, and
wherein the carrier fluid source is for achieving the transporting function of the transport channel by receiving the control signal of the carrier fluid controller and supplying a carrier fluid to the transport channel.

3. The microparticle producing system of claim 2,
wherein the carrier fluid source further comprises a carrier fluid storage tank and a carrier fluid supply pump,
wherein the carrier fluid storage tank and the transport channel are in fluid connection with one another by a carrier fluid inlet port,
wherein the carrier fluid supply pump is configured to transmit pressure to the carrier fluid storage tank, and
wherein the carrier fluid controller is configured to transmit a control signal to the carrier fluid supply pump.

4. The microparticle producing system of claim 2,
wherein the droplet producing chip further comprises an adapter, and
wherein the transport channel and the first outlet channel are in fluid connection with one another by the adapter.

5. The microparticle producing system of claim 2,
wherein the microparticle producing system further comprises at least one sensor,
wherein the at least one sensor is connected to transmit a signal of a measurement value to the carrier fluid controller,
wherein the measurement value is one or more selected from a flow velocity, a flow rate, a temperature, and a pressure of a fluid, and wherein the at least one sensor is for measuring the measurement value of a fluid flowing through one or more of the inlet channel, the transport channel, and the first outlet channel.

6. The microparticle producing system of claim 2,
wherein the microparticle producing system further comprises
a second droplet producing chip,
wherein the second droplet producing chip comprises an inlet channel, a microchannel, a junction, and a second outlet channel;
wherein the transport channel comprises a first transport channel, a second transport channel, and a third transport channel,
wherein the first outlet channel and the first transport channel are in fluid connection with one another,
wherein the second outlet channel and the second transport channel are in fluid connection with one another,
wherein the carrier fluid source and the first transport channel are in fluid connection with one another,
wherein the carrier fluid source and the second transport channel are connected so that a in fluid can flow connection with one another, wherein the first transport channel and the second transport channel are for transporting a discharge fluid comprising material and droplets discharged from the first and second droplet producing chips, respectively, to the product storage tank,
wherein the first transport channel and the second transport channel are connected with the third transport channel at a confluence,
wherein the third transport channel is connected with the product storage tank, and
wherein the first transport channel and the second transport channel are connected with the product storage tank through the confluence and the third transport channel.

7. The microparticle producing system of claim 2,
wherein the microparticle producing system further comprises a second droplet producing chip,
wherein the first droplet producing chip further comprises a second outlet channel and a first sidewall,
wherein the second droplet producing chip comprises an inlet channel, a microchannel, a junction, a third outlet channel, a fourth outlet channel, and a second sidewall,
wherein the first outlet channel and the second outlet channel are in fluid communication with the transport channel along the first sidewall of the first droplet producing chip,
wherein the third outlet channel and the fourth outlet channel are in fluid communication with the transport channel along the second sidewall of the second droplet producing chip, and
wherein the first droplet producing chip and the second droplet producing chip are disposed so that the first sidewall and the second sidewall face the same direction.

* * * * *